US012673312B2

(12) United States Patent
Park et al.

(10) Patent No.: US 12,673,312 B2
(45) Date of Patent: Jul. 7, 2026

(54) SUPER ABSORBENT POLYMER

(71) Applicant: LG Chem, Ltd., Seoul (KR)

(72) Inventors: Dong Hoon Park, Daejeon (KR); Yeneung Lee, Daejeon (KR); Sung Soo Park, Daejeon (KR); Jiyeon Byeon, Daejeon (KR); Junwye Lee, Daejeon (KR); Kwangin Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 19/078,460

(22) Filed: Mar. 13, 2025

(65) Prior Publication Data

US 2025/0352984 A1 Nov. 20, 2025

(30) Foreign Application Priority Data

May 16, 2024 (KR) ........................ 10-2024-0064063

(51) Int. Cl.
*B01J 20/26* (2006.01)

(52) U.S. Cl.
CPC ........... *B01J 20/261* (2013.01); *B01J 20/267* (2013.01); *B01J 2220/68* (2013.01)

(58) Field of Classification Search
None
See application file for complete search history.

(56) References Cited

U.S. PATENT DOCUMENTS

| | | | |
|---|---|---|---|
| 6,319,558 | B1 | 11/2001 | Willemsen |
| 10,994,260 | B2 | 5/2021 | Kovacic et al. |
| 2005/0003191 | A1 | 1/2005 | Ehrnsperger et al. |
| 2007/0264489 | A1 | 11/2007 | Sasabe et al. |
| 2008/0021150 | A1 | 1/2008 | Becker et al. |
| 2013/0102750 | A1 | 4/2013 | Watanabe et al. |
| 2013/0136713 | A1 | 5/2013 | Terada et al. |
| 2013/0175473 | A1 | 7/2013 | Wada et al. |
| 2014/0031203 | A1 | 1/2014 | Kondo et al. |
| 2015/0299404 | A1 | 10/2015 | Daniel et al. |
| 2015/0307681 | A1 | 10/2015 | Park et al. |
| 2016/0208035 | A1 | 7/2016 | Ryu et al. |
| 2017/0014801 | A1 | 1/2017 | Ikeuchi et al. |
| 2017/0073478 | A1 | 3/2017 | Joo et al. |
| 2017/0312148 | A1 | 11/2017 | Dobrosielska-Oura et al. |
| 2018/0021437 | A1 | 1/2018 | Kim et al. |
| 2018/0243464 | A1 | 8/2018 | Hwang et al. |
| 2019/0308171 | A1 | 10/2019 | Kim et al. |
| 2020/0139344 | A1 | 5/2020 | Kim et al. |
| 2021/0033516 | A1 | 2/2021 | Toennessen et al. |
| 2021/0113989 | A1 | 4/2021 | Hur et al. |
| 2021/0121852 | A1 | 4/2021 | Herfert et al. |
| 2021/0154637 | A1 | 5/2021 | Pfeiffer et al. |
| 2021/0244844 | A1 | 8/2021 | Chan et al. |
| 2021/0362126 | A1 | 11/2021 | Bauer et al. |
| 2022/0088568 | A1 | 3/2022 | Kimura et al. |
| 2023/0102961 | A1 | 3/2023 | Nishimura et al. |
| 2023/0374232 | A1 | 11/2023 | Ryu et al. |
| 2023/0381744 | A1 | 11/2023 | Woo et al. |
| 2024/0278211 | A1 | 8/2024 | Han et al. |

FOREIGN PATENT DOCUMENTS

| | | | |
|---|---|---|---|
| CN | 001136355 | C | 1/2004 |
| EP | 4253451 | A1 | 10/2023 |
| JP | H08122284 | A | 5/1996 |
| JP | 2001106728 | A | 4/2001 |
| JP | 2002504568 | A | 2/2002 |
| JP | 2005097569 | A | 4/2005 |
| JP | 3745539 | B2 | 2/2006 |
| JP | 2006527641 | A | 12/2006 |
| JP | 2007512405 | A | 5/2007 |
| JP | 2009057496 | A | 3/2009 |
| JP | 4261853 | B2 | 4/2009 |
| JP | 4284767 | B2 | 6/2009 |
| JP | 4908545 | B2 | 4/2012 |
| JP | 2012097273 | A | 5/2012 |
| JP | WO 2012144564 | A1 | 7/2014 |
| JP | 5616437 | B2 | 10/2014 |
| JP | 5692844 | B2 | 4/2015 |
| JP | 2017531531 | A | 10/2017 |
| JP | 2018510041 | A | 4/2018 |

(Continued)

OTHER PUBLICATIONS

Fibikar et al., "Quantification of cation-exchanged zeolites by XPS and EDS: A comparative study." Microporous and Mesoporous Materials 132 (2010) 296-299.*

Zhang, Shuxin, et al., "Predicting the Swelling Behavior of Acrylic Superabsorbent Polymers Used in Diapers", Advances in Polymer Technology, Dec. 2021, 7 pages, vol. 2021.

Shi, Mingsheng, et al., "The Development of a Polysaccharide-Based Hydrogel Encapsulating Tobramycin-Loaded Gelatine Microspheres as an Antibacterial System", Gels 2023, Mar. 2023, 15 Pages, vol. 9(3), No. 219.

Situ, Y, et al., "Synthesis and application of super absorbent polymers synthesized with ammonia solution and diatomaceous earth with low toxic residues" Environmental Technology & Innovation, Oct. 2023, pp. 1-12, vol. 32.

Kwon, Y.R."Surface-crosslinking of itaconic acid-based superabsorbent polymer using a novel bio-based surface-crosslinker based on succinic acid"Polymer-Plastics Technology and Materials, Taylor & Francis, Mar. 2023, pp. 1057-1066, Vol. 62, Issue 8.

(Continued)

*Primary Examiner* — Daniel Berns

(74) *Attorney, Agent, or Firm* — Lerner David LLP

(57) ABSTRACT

A polyacrylic acid (salt)-based super absorbent polymer, includes carbon, oxygen, and sodium on the surface thereof, and satisfies Equation 1: $X_{C=O}+X_{O-C=O}\geq 6$(at %) wherein, $X_{C=O}$ represents the content (at %) of carbon included in a CO bond structure among all elements present on the surface of the super absorbent polymer according to XPS analysis, and $X_{O-C=O}$ represents the content (at %) of carbon included in a O—C=O bond structure among all elements present on the surface of the super absorbent polymer according to XPS analysis.

12 Claims, No Drawings

(56) References Cited

FOREIGN PATENT DOCUMENTS

| | | | |
|---|---|---|---|
| JP | 2021510320 | A | 4/2021 |
| JP | 6950158 | B2 | 10/2021 |
| JP | 6959030 | B2 | 11/2021 |
| JP | 7181948 | B2 | 12/2022 |
| JP | 7270828 | B2 | 5/2023 |
| JP | 7362653 | B2 | 10/2023 |
| KR | 100317398 | B1 | 11/2002 |
| KR | 20070048226 | A | 5/2007 |
| KR | 20130097771 | A | 9/2013 |
| KR | 20140063116 | A | 5/2014 |
| KR | 20150087368 | A | 7/2015 |
| KR | 20150143181 | A | 12/2015 |
| KR | 20160127742 | A | 11/2016 |
| KR | 101700354 | B1 | 1/2017 |
| KR | 20170111295 | A | 10/2017 |
| KR | 20180073334 | A | 7/2018 |
| KR | 101918647 | B1 | 11/2018 |
| KR | 20190012809 | A | 2/2019 |
| KR | 20190016534 | A | 2/2019 |
| KR | 101989142 | B1 | 6/2019 |
| KR | 20200051565 | A | 5/2020 |
| KR | 20200123127 | A | 10/2020 |
| KR | 102322774 | B1 | 11/2021 |
| KR | 20220049961 | A | 4/2022 |
| KR | 20220088351 | A | 6/2022 |
| KR | 20220169431 | A | 12/2022 |
| KR | 20220169444 | A | 12/2022 |
| KR | 102568226 | B1 | 8/2023 |
| KR | 102578740 | B1 | 9/2023 |
| KR | 20240014710 | A | 2/2024 |
| WO | 2022131838 | A1 | 6/2022 |
| WO | 2022265459 | A1 | 12/2022 |
| WO | 2022265466 | A1 | 12/2022 |
| WO | 2022265472 | A1 | 12/2022 |

OTHER PUBLICATIONS

Sharma, S. et al., "Superabsorbent Polymer Gels based on Polyaspartic Acid and Polyacrylic Acid" Journal of Material Science & Engineering, Feb. 2016, pp. 1-7, Vol. 5, Issue 3.

International Search Report for Application No. PCT/KR2025/006678 mailed Aug. 29, 2025, 11 pages.

* cited by examiner

SUPER ABSORBENT POLYMER

CROSS-REFERENCE TO RELATED APPLICATION

This application claims priority to Korean Patent Application No. 10-2024-0064063 filed on May 16, 2024, the content of which is incorporated by reference in its entirety.

BACKGROUND

The present disclosure herein relates to a super absorbent polymer exhibiting an improved absorption rate and absorption performance.

A super absorbent polymer (SAP) is a synthetic polymer material which has the ability capable of absorbing moisture 500 times to 1,000 times its own weight, and is given different names, such as a super absorbency material (SAM) and an absorbent gel material (AGM), in the industry. The above-described super absorbent polymer was first put into practical use in sanitary articles, and is now widely used as a material for soil water retainers for horticulture, a civil engineering work, a construction index material, a seedling sheet, a freshness maintaining agent in a food distribution field, and a materials for steaming in the food distribution industry.

The super absorbent polymer is widely used in the field of hygiene products such as diapers or sanitary napkins. In the hygiene product, the super absorbent polymer is generally included in a dispersed state in a pulp. However, in recent years, efforts have been made to provide sanitary products such as thinner diapers, and as part of the efforts, development of products with a reduced content of pulps, or furthermore, with no pulps, such as so-Called pulpless diapers, is actively in progress.

As described above, in the case of a hygiene product with a reduced content of pulps or with no pulps, a super absorbent polymer is contained in a relatively high proportion, so that super absorbent polymer particles are inevitably included in multiple layers in the hygiene product. In order for the total super absorbent polymer particles included in multiple layers to absorb a large amount of liquid such as urine more efficiently, the super absorbent polymer is required to exhibit not only high absorption performance but also quick vortex time. Meanwhile, the most general method for increasing the above-described absorption properties may be a method for forming a porous structure inside a super absorbent polymer, thereby widening the surface area of the super absorbent polymer, and in order to widen the surface area of the super absorbent polymer, a method for forming a porous structure inside base polymer powder by including a foaming agent in a monomer composition and performing cross-linking polymerization is generally adopted.

However, there is a disadvantage in that overall physical properties of the super absorbent polymer, for example, surface tension, permeability, volume density, and the like are degraded due to the use of the foaming agent, and the amount of generated fine powder increases, and accordingly, there has been a continuous demand for the development of a technology capable of improving absorption properties of a super absorbent polymer without the use of a foaming agent.

Accordingly, in order to fundamentally solve the above-described problem, there has been a continuous demand for the development of a super absorbent polymer.

SUMMARY

The present disclosure is to provide a super absorbent polymer having excellent absorption properties by appropriately adjusting the content of carbon included in bond structures of C═O and O—C═O present on the surface of the super absorbent polymer (SAP).

In accordance with an exemplary aspect of the present disclosure, there is provided a super absorbent polymer, which is a polyacrylic acid (salt)-based super absorbent polymer, wherein the polymer includes carbon, oxygen, and sodium on the surface thereof, and the polymer satisfies Equation 1 below.

$$X_{C=O}+X_{O\text{-}C=O}\geq 6\text{(at \%)} \quad \text{[Equation 1]}$$

In Equation 1 above, $X_{C=O}$ represents the content (at %) of carbon included in a C═O bond structure among all elements present on the surface of the polymer according to XPS analysis, and $X_{O-C=O}$ represents the content (at %) of carbon included in a O—C═O bond structure among all elements present on the surface of the polymer according to XPS analysis.

DETAILED DESCRIPTION

Unless otherwise defined herein, all technical and scientific terms are used to describe illustrative aspects only and are not intended to limit the present disclosure. Singular expressions include plural expressions unless the context clearly indicates otherwise. In the present specification, it should be understood that the term “include,” “comprise,” or “have” is intended to specify the presence of stated features, numbers, steps, elements, or combinations thereof, but do not preclude the presence or addition of one or more other features, numbers, steps, elements, or combinations thereof.

The present disclosure may be modified in various ways and may take many forms, and specific aspects are illustrated and described in detail below. It should be understood, however, that it is not intended to limit the present disclosure to the particular forms disclosed, but rather, is intended to cover all modifications, equivalents, and alternatives falling within the spirit and scope of the above ideas and techniques.

The terminology used herein is for reference only to particular implementations, and is not intended to limit the present disclosure. In addition, the singular forms used herein include plural forms, unless the phrases clearly indicate the opposite meaning.

The term “polymer” used herein means that a water-soluble ethylene-based polyunsaturated monomer is in a polymerized state, and may cover any moisture content range or particle diameter range.

In addition, the term “super absorbent polymer” either means, depending on the context, a cross-linked polymer, or a base polymer in the form of powder in which the cross-linked polymer is made of pulverized super absorbent polymer particles, or is used to cover the cross-linked polymer or the base polymer subjected to additional processes, such as drying, pulverization, classification, surface cross-linking, etc., thereby being in a state suitable for commercialization.

In addition, the term “chopping” refers to cutting a hydrogel polymer into small pieces in a millimeter unit to increase drying efficiency, and is used separately from pulverizing the same to a micrometer or normal particle level.

In addition, the term “micronizing, or micronization” refers to pulverizing a hydrogel polymer into pieces having a particle diameter of tens to hundreds of micrometers, and is used separately from "chopping."

In the present specification, 'the content of a specific element present on the surface of a polymer' refers to the weight percentage ratio of the specific element's content to the total content of elements, measured within a depth of approximately 10 nm from the polymer surface and derived through X-ray photoelectron spectroscopy (XPS) analysis, with the total content set to 100 weight %. Specifically, the X-ray photoelectron spectroscopy (XPS) analysis is performed through the following steps.

① Step 1

A super absorbent polymer (SAP) with a size of at least 400 μm×800 μm is attached to copper foil, and then fixed with carbon tape and loaded into XPS equipment. The size of the SAP must be at least equal to the minimum X-ray beam size.

② Step 2

The super absorbent polymer is loaded into the XPS equipment as in Step 1, and then moved to an analysis chamber when the degree of vacuum in a load lock becomes sufficiently lowered (at least $1\times10^{-7}$ mBar).

③ Step 3

Qualitative analysis is performed to identify the type of an element detected through a survey scan in the analysis chamber. Subsequently, quantitative analysis is performed to confirm the content by element (atomic %, at %) at 3 points through a narrow scan of each element detected through the survey scan.

Through Steps 1 to 3 above, the content of elements on the surface of the super absorbent polymer may be obtained, respectively. In addition, in order to obtain the content of carbon included in each of C—C, C═O, C═O, and O—C═O bond structures related to carbon, Step 4 below is additionally performed.

The conditions for the survey scan and narrow scan are as follows.

[Survey Scan Conditions]

XPS model: K-Alpha+ (Thermo Fisher Scientific Inc.)
X-ray Source: Al Kα (1486.68 eV)
Analyzer: CAE mode
X-ray spot size (Beam size): 400 μm×800 μm
Charge compensation: FG03 mode (150 μA, 1.0 V)
Scan range: −10~ 1360 eV
Step size: 1 eV
Per point dwell time: 20 ms
Number of scans: 10
Pass energy: 200 e V
Depth profile: As-received analysis, Ion Gun not used

[Narrow Scan Conditions]

XPS model: K-Alpha+ (Thermo Fisher Scientific Inc.)
X-ray Source: Al Kα (1486.68 eV)
Analyzer: CAE mode
X-ray spot size (Beam size): 400 μm×800 μm
Charge compensation: FG03 mode (150 μA, 1.0 V)
Scan range: 10~ 40 e V
Step size: 0.1 eV
Per point dwell time: 50 ms
Number of scans: 10
Pass energy: 50 e V
Depth profile: As-received analysis, Ion Gun not used ④ Step 4

Fitting is performed on a C 1s spectrum secured through the narrow scan in Step 3, to calculate an area ratio with respect to each of the C—C, C═O, C═O, and O—CO bond structures related to carbon. The fitting process is conducted using the Lorentzian/Gaussian mix method (30%: 70%). The content of carbon in each of the bond structures related to carbon is calculated using the area ratio and the content of carbon confirmed through the narrow scan. Specifically, the calculation is performed using Equation 1 below.

$X_A$═C content(atomic %)×(A area ratio/total area ratio)[Equation 1]

In Equation 1 above, the A represents one of C—C, C═O, C═O, and O—C═O bond structures related to carbon present on the surface of a super absorbent polymer, the total area ratio represents an area ratio of total carbon elements with respect to all elements present on the surface of the polymer, and the A area ratio represents an area ratio of a A structure with respect to all elements.

In the present specification, elemental symbols as those described in the periodic table are used.

Hereinafter, a super absorbent polymer according to a specific aspect of the present disclosure and a preparation method therefor will be described in more detail.

I. Polyacrylic acid (salt)-based super absorbent polymer

The super absorbent polymer of the present disclosure is a polyacrylic acid (salt)-based super absorbent polymer in which the type or content of additives in a surface cross-linking process during a preparation process of the polymer are controlled, and various process conditions in polymerization and pulverization processes and the like are appropriately controlled, so that the content of carbon included in C═O and O—C═O bond structures among all elements present on the surface of the super absorbent polymer are controlled.

The surface of the polymer includes carbon, oxygen, and sodium.

In addition, in an aspect of the present disclosure, the surface of the polymer may further include one or more elements selected from the group consisting of silicon, nitrogen, aluminum, and sulfur.

In an aspect of the present disclosure, the polymer may satisfy Equation 1 below.

$$X_{C═O}+X_{O\text{-}C═O}\geq 6\text{(at \%)} \quad \text{[Equation 1]}$$

In Equation 1 above, $X_{C═O}$ represents the content (at %) of carbon included in a C═O bond structure among all elements present on the surface of the polymer according to XPS analysis, and $X_{O—C═O}$ represents the content (at %) of carbon included in a O—C═O bond structure among all elements present on the surface of the polymer according to XPS analysis.

In an aspect of the present disclosure, the content of carbon $X_{C═O}$ and $X_{O—C═O}$ included in the C═O and O—C═O bond structures among all elements present on the surface of the polymer may be 6 at % or greater, 7 at % or greater, or 8 at % or greater. The content of carbon is a content according to XPS analysis.

In an aspect of the present disclosure, the polymer may satisfy Equation 2 below.

$$X_{C═O}+X_{O—C═O}\leq 15\text{(at \%)} \quad \text{[Equation2]}$$

In an aspect of the present disclosure, the content of carbon included in the C═O and O—C═O bond structures among all elements present on the surface of the polymer may be 15 at % or less, 14 at % or less, 13 at % or less, or 12 at % or less.

A super absorbent polymer is prepared by cross-linking polymer main chains composed of carbon atoms to create a mesh structure, and by attaching water-loving ion molecules to the mesh structure. Therefore, by forming a surface cross-linking layer through the surface cross-linking process, it is possible to improve the physical properties of the super absorbent polymer. The surface of the super absorbent polymer includes carbon, oxygen, and sodium as main components.

That is, if the content of carbon included in the C═O and O—C═O bond structures is less than 6 at %, an initial absorption rate, represented by 1-minute tap water free absorbency (TWFA), may be low due to a low concentration of ions present on the surface, and if the content of carbon included in the C═O and O—C═O bond structures is greater than 15 at %, the degree of cross-linking of the surface is high, which hinders swelling, so that the initial absorption rate may be reduced. That is, the content of carbon included in the C═O and O—C═O bond structures among all elements present on the surface of the polymer may affect the absorption performance of the super absorbent polymer.

As a result, if the content of carbon included in the C═O and O—C═O bond structures among all elements present on the surface of the polymer according to the present disclosure is satisfied, the absorption capacity of the super absorbent polymer becomes excellent.

In an aspect of the present disclosure, the super absorbent polymer may satisfy Equation 3 below.

$$X_{C=O} \geq X_{O-C=O} \quad \text{[Equation 3]}$$

That is, on the surface of the super absorbent polymer according to the present disclosure, the content of carbon included in the C═O bond structure may be equal to or greater than the content of carbon included in the O—C═O bond structure. If the above is satisfied, the performance of the super absorbent polymer may be more excellent.

In an aspect of the present disclosure, the content of carbon $X_{O-C=O}$ included in the O—C═O bond structure among all elements present on the surface of the polymer may be 2.5 at % or greater, or 2.7 at % or greater. In addition, the content of carbon included in the O—C═O bond structure among all elements present on the surface of the polymer may be 10.0 at % or less, 8.0 at % or less, or 5.0 at % or less.

In an aspect of the present disclosure, the content of carbon $X_{C=O}$ included in the C═O bond structure among all elements present on the surface of the polymer may be 3.5 at % or greater, or 3.6 at % or greater. In addition, the content of carbon included in the C═O bond structure among all elements present on the surface of the polymer may be 15.0 at % or less, 12.0 at % or less, or 10.0 at % or less.

In an aspect of the present disclosure, the polymer may satisfy Equation 4 below.

$$(X_{O-C=O}/X_C)\times 100(\%) \leq 10(\%) \quad \text{[Equation 4]}$$

In Equation 4 above, $X_C$ represents the total content (at %) of carbon among all elements present on the surface of the polymer according to XPS analysis.

In an aspect of the present disclosure, the polymer may satisfy Equation 5 below.

$$(X_{C=O}/(X_{C=O}+X_{O-C=O}))\times 100(\%) \geq 40(\%) \quad \text{[Equation5]}$$

In an aspect of the present disclosure, the polymer may further include one or more elements selected from the group consisting of silicon, nitrogen, aluminum, and sulfur on the surface of the polymer.

In an aspect of the present disclosure, as a result of the XPS analysis, the content of an oxygen element with respect to the total particles present on the surface of the polymer may be 50 at % or less, or 46 at % or less.

In an aspect of the present disclosure, as a result of the XPS analysis, the content of a sodium element with respect to the total particles present on the surface of the polymer may be 6 at % or less, or 5.5 at % or less.

In an aspect of the present disclosure, as a result of the XPS analysis, the content of a silicon element with respect to the total particles present on the surface of the polymer may be 15 at % or less, or 12 at % or less.

In an aspect of the present disclosure, as a result of the XPS analysis, the sum of the content of the elements with respect to the total particles present on the surface of the polymer is 100 at %.

In an aspect of the present disclosure, the polymer may satisfy Equation 6 below.

$$X_{C=O}+X_{O-C=O} \geq X_{Na} \quad \text{[Equation 6]}$$

In Equation 6 above, $X_{Na}$ represents the content (at %) of sodium among all elements present on the surface of the polymer.

The super absorbent polymer of the present disclosure may have a free swell capacity of 130 g/g or greater, 160 g/g or greater, 170 g/g or greater, or 185 g/g or greater, and 230 g/g or less, 225 g/g or less, or 220 g/g or less, as measured by allowing 1 g of the super absorbent polymer to be swollen for 1 minute with water having an electrical conductivity of 100 μS/cm to 130 μS/cm at room temperature (24° C.).

The present inventors have confirmed that if the content of carbon included in the C═O and O—C═O bond structures among all elements present on the surface of a super absorbent polymer satisfies a specific range, the absorbency and absorption rate in the water having an electrical conductivity value of 100 μS/cm to 130 μS/cm may be excellent, and have completed the present disclosure.

A super absorbent polymer is widely used as a material not only for hygiene products but also for soil repair agents for horticulture, a civil engineering work, a construction index material, a seedling sheet, a freshness maintaining agent in a food distribution field, and a fomentation. Therefore, the super absorbent polymer needs to have excellent absorption properties for water with a lower ion concentration than 0.9% brine.

Urine and the like discharged from the body have a similar ion concentration and electrical conductivity to 0.9% brine, but 0.9% brine has a high concentration of ions, and thus, is absorbed in a small absorption amount into a super absorbent polymer and has a relatively low absorption rate, so that it is difficult to fully evaluate the performance of the super absorbent polymer.

In addition, even if the same super absorbent polymer is used, the absorption behavior in water having an electrical conductivity of 100 μS/cm to 130 μS/cm and the absorption behavior in 0.9% bring having an electrical conductivity of about 16,100 μS/cm are bound to be different. Accordingly, even if the initial absorption rate or maximum absorption capacity of 0.9% brine having an electrical conductivity of about 16,100 μS/cm is similar, the initial absorption rate or maximum absorption capacity of water with an electrical conductivity of 100 μS/cm to 130 μS/cm is not necessarily similar. Therefore, it can be said that identifying the absorption performance and absorption rate in water having an electrical conductivity of 100 μS/cm to 130 μS/cm is independent of using 0.9% brine having an electrical conductivity of about 16,100 μS/cm.

Accordingly, the present inventors have tried to develop a super absorbent polymer excellent in absorption rate and absorption capacity with respect to water having an ion concentration and an electrical conductivity lower than those of 0.9% brine, the water having an electrical conductivity of 100 μS/cm to 130 μS/cm, that is about 1/100 of the electrical conductivity of 0.9% brine, and have implemented the super absorbent polymer by adjusting the content of carbon included in C═O and O—C═O bond structures among all elements present on the surface of the super absorbent polymer.

As water having a lower ion concentration than the 0.9% brine, the present inventors used water having an electrical conductivity of 100 μS/cm to 130 μS/cm at 24° C., which is about 1/100 of about 16,100 μS/cm, that is the electrical conductivity of 0.9% brine at 24° C., to identify the maximum capacity of water containable by the super absorbent polymer, and in an aspect, water having an electrical conductivity of 110 μS/cm at 24° C. was used. In the case of water in the range of an electrical conductivity of 100 μS/cm to 130 μS/cm, there is no significant difference in absorption properties according to the electrical conductivity.

A method for measuring the absorbency in water having an electrical conductivity value of 100 μS/cm to 130 μS/cm will be described in more detail in the section of experimental examples to be described later.

The super absorbent polymer according to the present disclosure is characterized in that the content of carbon included in C═O and O—C═O bond structures among all elements present on the surface of the super absorbent polymer is controlled, and as to be described later, the control of the content of carbon may be achieved by a method of controlling the type or content of additives in a surface cross-linking process of the super absorbent polymer, polymerization conditions or pulverization conditions, or the like.

Hereinafter, each component constituting the super absorbent polymer will be described in more detail.

A polyacrylic acid (salt)-based super absorbent polymer of an aspect of the disclosure includes a base polymer including a water-soluble ethylene-based unsaturated monomer having an acid group and a cross-linked polymer of an internal cross-linking agent. The cross-linked polymer may be formed by polymerizing a monomer composition which includes components such as a monomer, an internal cross-linking agent, a polymerization initiator, and the like.

Here, the water-soluble ethylene-based unsaturated monomer may be any monomer commonly used in the preparation of a super absorbent polymer. As a non-limiting example, the water-soluble ethylene-based unsaturated monomer may be a compound represented by Formula 1 below.

R-COOM' [Formula 1]

In Formula 1 above, R is an alkyl group having 2 to 5 carbon atoms including an unsaturated bond, and M' is a hydrogen atom, a monovalent or divalent metal, an ammonium group, or an organic amine salt.

For example, the monomer may be a (meth)acrylic acid, and one or more selected from the group consisting of a monovalent (alkali) metal salt, a divalent metal salt, an ammonium salt, and organic amine salt of these acids.

If the (meth)acrylic acid and/or a salt thereof is used as the water-soluble ethylene-based unsaturated monomer as described above, it is advantageous in terms of obtaining a super absorbent polymer with improved absorbency. In addition, as the monomer, maleic anhydride, fumaric acid, crotonic acid, itaconic acid, 2-acryloylethane sulfonic acid, 2-methacryloylethanesulfonic acid, 2-(meth)acryloylpropanesulfonic acid or 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth) acrylamide, or the like may be used.

The water-soluble ethylene-based unsaturated monomer has an acid group. Meanwhile, in the preparation of the super absorbent polymer, at least a portion of the acid group forms a polymer by cross-linking a monomer neutralized by a neutralizing agent, but in the present disclosure, the acid group may be neutralized not during polymerization, but after the formation of a polymer. More specific details on this will be provided in the section on a method for preparing a super absorbent polymer.

The concentration of the water-soluble ethylene-based unsaturated monomer in the monomer composition may be appropriately adjusted in consideration of polymerization time, reaction conditions, etc., and may be about 20 wt % to about 60 wt %, or about 20 wt % to about 40 wt %.

As used herein, the term "internal cross-linking agent" is a term used to distinguish the same from a surface cross-linking agent for cross-linking the surface of super absorbent polymer particles to be described later, and an internal cross-linking agent serves to form a polymer including a cross-linking structure by introducing a cross-linking bond between unsaturated bonds of the above-described water-soluble ethylene-based unsaturated monomers.

The cross-linking in the above step is performed without distinction between the surface and the inside, but if a surface cross-linking process of the super absorbent polymer particles to be described later is performed, the surfaces of finally prepared super absorbent polymer particles may include a structure newly cross-linked by the surface cross-linking agent, and the inside of the super absorbent polymer particles may maintain a structure cross-linked by the internal cross-linking agent.

According to an aspect of the present disclosure, the internal cross-linking agent may include one or more of a polyfunctional acrylate-based compound, a polyfunctional allyl-based compound, or a polyfunctional vinyl-based compound.

Non-limiting examples of the polyfunctional acrylate-based compound may include ethylene glycol di(meth) acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, tripropylene glycol di(meth)acrylate, polypropylene glycol di(meth)acrylate, butanediol di(meth) acrylate, butylene glycol di(meth)acrylate, hexanediol di(meth)acrylate, pentaerythritol di(meth)acrylate, pentaerythritol tri (meth)acrylate, pentaerythritol tetra(meth) acrylate, dipentaerythritol di(meth)acrylate, dipentaerythritol tri (meth)acrylate, dipentaerythritol tetra(meth)acrylate, dipentaerythritol penta (meth)acrylate, trimethylolpropane di(meth)acrylate, trimethylolpropane tri (meth)acrylate, glycerin di(meth)acrylate, glycerin tri (meth)acrylate, or the like, and any one thereof may be used alone, or two or more thereof may be mixed and used.

Non-limiting examples of the polyfunctional allyl-based compound may include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropyleneglycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, glycerin triallyl ether, or the like, and any one thereof may be used alone, or two or more thereof may be mixed and used.

Non-limiting examples of the polyfunctional vinyl-based compound may include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, glycerin trivinyl ether, or the like, and any one thereof may be used alone or two or more thereof may be mixed and used. For example, pentaerythritol triallyl ether may be used.

In the above-described polyfunctional allyl-based compound, or the polyfunctional vinyl-based compound, two or more unsaturated groups included in a molecule may be respectively bonded to unsaturated bonds of the water-soluble ethylene-based unsaturated monomers or unsaturated bonds of another internal cross-linking agent, thereby forming a cross-linking structure during a polymerization process, and unlike an acrylate-based compound including an ester bond (—(C═O)O—) in a molecule, may maintain cross-linking bonds more stably even during a neutralization process to be described later after the polymerization reaction.

Accordingly, the gel strength of a prepared super absorbent polymer may increase, the process stability may increase during a discharge process after polymerization, and the amount of extractable contents may be reduced to a minimum.

The “extractable contents” refers to a compound in the form of a polymer not cross-linked in the process of preparing a super absorbent polymer, which may be generated due to incomplete cross-linking when the super absorbent polymer is polymerized, resulting in no cross-linking, or decomposition of a cross-linking agent during a chopping or drying process, or breakage of a main polymer chain.

Extractable contents are usually eluted when a super absorbent polymer expands by absorbing a liquid, and a high content of eluted extractable contents means that cross-linking properties in the super absorbent polymer are not excellent.

Since the eluted extractable contents remain mostly on the surface of the super absorbent polymer, the surface may become sticky, and particularly, when the super absorbent polymer is applied and used in a product such as a diaper, permeability is reduced to cause a problem of unpleasant feeling.

Therefore, it is necessary to minimize the amount of extractable contents of the super absorbent polymer.

Cross-linking polymerization of the water-soluble ethylene-based unsaturated monomer in the presence of the above-described internal cross-linking agent may be performed in the presence of a polymerization initiator, and if necessary, a thickener, a plasticizer, a preservation stabilizer, an antioxidant, or the like.

In the monomer composition, the above-described internal cross-linking agent may be used in an amount of 0.01 parts by weight to 5 parts by weight based on 100 parts by weight of the water-soluble ethylene-based unsaturated monomer. For example, the internal cross-linking agent may be used in an amount of 0.01 parts by weight or greater, 0.05 parts by weight or greater, or 0.1 parts by weight or greater, and 5 parts by weight or less, 3 parts by weight or less, 2 parts by weight or less, 1 part by weight or less, or 0.7 parts by weight or less. If the content of the internal cross-linking agent is too low, cross-linking is not sufficiently achieved, so that it may be difficult to implement strength of an appropriate level or above, and if the content of the internal cross-linking agent is too high, the internal cross-linking density increases, so that it may be difficult to implement a desired centrifuge retention capacity.

Meanwhile, if the internal cross-linking agent is used in a small content to allow the base polymer to have a high centrifuge retention capacity (CRC), the gel strength of a prepared polymer may be lowered, and due to the low gel strength, it may be difficult to operate a chopper and the like when chopping a hydrogel polymer. In this case, two or more types of internal cross-linking agents may be mixed and used for the operation of a high-speed rotating chopper and the like to increase the gel strength, thereby increasing the operating stability of the chopping and the like.

The shape of particles of the formed hydrogel polymer may change depending on the degree of internal cross-linking, and a polymer formed using such an internal cross-linking agent may have a three-dimensional network structure in the form in which main chains formed by the polymerization of the water-soluble ethylene-based unsaturated monomers are cross-linked by the internal cross-linking agent.

As described above, if a polymer has a three-dimensional network structure, the centrifuge retention capacity and the absorbency under pressure, which are overall physical properties of a super absorbent polymer, may be significantly improved compared to having a two-dimensional linear structure in which additional cross-linking is not performed by an internal cross-linking agent.

The polymer is prepared by polymerizing a monomer and an internal cross-linking agent in the presence of a polymerization initiator, and the type of the polymerization initiator is not particularly limited, but for example, the polymerization may be performed using a thermal polymerization method in a batch reactor, and accordingly, a thermal polymerization initiator may be used as the polymerization initiator.

As the thermal polymerization initiator, one or more selected from the group consisting of a persulfate-based initiator, an azo-based initiator, and an initiator composed of hydrogen peroxide and ascorbic acid may be used. Specifically, examples of the persulfate-based initiator include sodium persulfate ($Na_2S_2O_8$), potassium persulfate ($K_2S_2O_8$), ammonium persulfate ($(NH_4)_2S_2O_8$), or the like, and examples of the azo-based initiator include 2,2-azobis (2-amidinopropane) dihydrochloride, 2,2-azobis-(N,N-dimethylene) isobutyramidine dihydrochloride, 2-(carbamoylazo) isobutylonitril, 2,2-azobis [2-(2-imidazolin-2-yl) propane]dihydrochloride, 4,4-azobis-(4-Cyanovaleric acid), or the like. More various thermal polymerization initiators are well specified on p203 of ‘Principle of Polymerization (Wiley, 1981)’ written by Odian, which is incorporated herein by reference, and are not limited to the above-described examples.

The above-described polymerization initiator may be used in an amount of 2 parts by weight or less based on 100 parts by weight of the water-soluble ethylene-based unsaturated monomer. That is, if the concentration of the polymerization initiator is too low, it is not preferable in that the polymerization rate may decrease, and remaining monomers may be extracted in a large amount in a final product. On the contrary, if the concentration of the polymerization initiator is higher than the above-described range, it is not preferable in that polymer chains forming a network is shortened, thereby degrading the physical properties of a polymer, such as increasing the content of extractable contents and lowering the absorbency under pressure.

Meanwhile, in an aspect of the present disclosure, the above-described polymerization initiator and a reducing agent forming a redox couple may be introduced together to the monomer composition to initiate polymerization.

Specifically, the initiator and the reducing agent react with each other when introduced to a polymer solution and form radicals.

The formed radicals react with the monomer, and since an oxidation-reduction reaction between the initiator and the reducing agent is highly reactive, polymerization is initiated even when only a trace amount of the initiator and the reducing agent are introduced, so that it is not necessary to increase the process temperature, thereby allowing low-temperature polymerization, and it is possible to minimize changes in physical properties of the polymer solution.

The polymerization reaction using the oxidation-reduction reaction may smoothly occur even at a temperature near or below room temperature (25° C.).

For example, the polymerization reaction may be performed at a temperature of 5° C. to 25° C. or 5° C. to 20° C.

In an aspect of the present disclosure, if a persulfate-based initiator is used as the initiator, the reducing agent may be one or more selected from the group consisting of sodium metabisulfite ($Na_2S_2O_5$), tetramethyl ethylenediamine (TMEDA), a mixture of iron (II) sulfate and EDTA ($FeSO_4$/EDTA), sodium formaldehyde sulfoxylate, and disodium 2-hydroxy-2-sulfinoacteate.

As an example, potassium persulfate may be used as the initiator, and disodium 2-hydroxy-2-sulfinoacteate may be used as the reducing agent, ammonium persulfate may be used as the initiator, and tetramethylammoniumdiamine may be used as the reducing agent, sodium persulfate may be used as the initiator, and sodium formaldehyde sulfoxylate may be used as the reducing agent.

In another aspect of the present disclosure, when a hydrogen peroxide-based initiator is used as the initiator, the reducing agent may be one or more selected from the group consisting of ascorbic acid, sucrose, sodium sulfite ($Na_2SO_3$), sodium metabisulfite ($Na_2S_2O_5$), tetramethyl ethylenediamine (TMEDA), a mixture of iron (II) sulfate and EDTA ($FeSO_4$/EDTA), sodium formaldehyde sulfoxylate, disodium 2-hydroxy-2-sulfinoacteate, and disodium 2-hydroxy-2-sulfoacteate.

The above-described monomer composition may further include an additive such as a thickener, a plasticizer, a preservation stabilizer, an antioxidant, or the like, if necessary.

In addition, the monomer composition including monomers may be, for example, in the state of a solution dissolved in a solvent such as water, and the content of solids in the monomer composition of the above-described solution state, i.e., the concentration of the monomers, the internal cross-linking agent, and the polymerization initiator, may be adjusted appropriately in consideration of the polymerization time, reaction conditions, etc. For example, the content of solids in the monomer composition may be 10 wt % to 80 wt %, 15 wt % to 60 wt %, or 30 wt % to 50 wt %.

A solvent that may be used at this time may be used without limitation in composition as long as the solvent can dissolve the above-mentioned components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butylolactone, carbitol, methyl cellosolve acetate, N,N-dimethylacetamide, or the like may be used in combination.

The polymer obtained by the above-described method may form a polymer having a high molecular weight and a uniform molecular weight distribution by performing polymerization by using an ethylene-based unsaturated monomer in an unneutralized state.

In addition, the polymer may have a moisture content of 30 wt % to 80 wt %. For example, the moisture content of the polymer may be 30 wt % or greater, 45 wt % or greater, or 50 wt % or greater, and 80 wt % or less, 70 wt % or less, or 60 wt % or less.

If the moisture content of the polymer is too low, it is difficult to obtain an appropriate surface area in a pulverization step, so that effective pulverization may not be achieved, and if the moisture content of the polymer is too high, a pressure applied in the pulverization step may increase, so that it may be difficult to perform pulverization to a desired particle size.

Meanwhile, throughout the present specification, the term “moisture content” refers to a value obtained by subtracting the weight of a polymer in a dry state from the weight of the polymer by the content of moisture occupying with respect to the total weight of the polymer. Specifically, the moisture content is defined as a value calculated by measuring the weight loss due to moisture evaporation from a polymer during a drying process performed by raising the temperature of the polymer in a crumb state through infrared heating. At this time, conditions of the drying are to increase the temperature from room temperature to about 180° C. and then maintain the temperature at 180° C., and the total drying time is set to 40 minutes, including 5 minutes for raising the temperature, and then the moisture content is measured.

The super absorbent polymer according to an aspect of the present disclosure includes the above-described base polymer powder containing the water-soluble ethylene-based unsaturated monomer having an acid group and the cross-linked polymer of an internal cross-linking agent, and a surface cross-linked layer formed on the base polymer powder by further cross-linking the cross-linked polymer by means of a surface cross-linking agent.

The surface cross-linked layer is formed on at least a portion of the surface of the base polymer powder, and may be formed by further cross-linking the cross-linked polymer included in the base polymer powder by means of the surface cross-linking agent.

As the surface cross-linking agent, any surface cross-linking agent used in the preparation of a super absorbent polymer may be used without particular limitation. For example, the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1, 3-propanediol, 2,5-hexanediol, 2-methyl-1,3-pentanediol, 2-methyl-2,4-pentanediol, tripropylene glycol, and glycerol, at least one carbonate-based compound selected from the group consisting of ethylene carbonate, propylene carbonate, and glycerol carbonate, an epoxy compound such as ethylene glycol diglycidyl ether, an oxazoline compound such as oxazolidinone, a polyamine compound, a mono-, di- or polyoxazolidinone compound, a cyclic urea compound, or the like.

Specifically, one or more, two or more, or three or more of the above-described surface cross-linking agents may be used as the surface cross-linking agent, and for example, two of propylene glycol and ethylene glycol diglycidyl ether may be used, or ethylene carbonate-propylene carbonate (ECPC), propylene glycol, and/or glycerol carbonate may be used.

The above-described surface cross-linking agent may be used in an amount of 0.001 parts by weight to 0.5 parts by weight based on 100 parts by weight of the super absorbent polymer particles. In this case, 100 parts by weight of the super absorbent polymer particles are based on the dried state. In addition, the content refers to the total amount of the surface cross-linking agent used.

For example, the surface cross-linking agent may be used in an amount of 0.005 parts by weight or greater, 0.01 parts by weight or greater, or 0.05 parts by weight or greater, greater than 0.5 parts by weight or greater, or 0.5 parts by weight or less, 0.4 parts by weight or less, or 0.2 parts by weight or less, less than 0.2 parts by weight or less based on 100 parts by weight of the super absorbent polymer particles. The content range of the surface cross-linking agent may be controlled to be within the above-described range to prepare a super absorbent polymer exhibiting excellent overall absorption physical properties.

In addition, the surface cross-linked layer may be formed by adding an inorganic material to the surface cross-linking agent. That is, in the presence of the surface cross-linking agent and the inorganic material, the surface cross-linked layer may be formed by further cross-linking the surface of the base polymer powder.

As the above-described inorganic material, one or more inorganic materials selected from the group consisting of silica, clay, alumina, a silica-alumina composite, titania, a zinc oxide, and an aluminum sulfate may be used. The above-described inorganic material may be used in a powder form or a liquid form. In addition, the inorganic material may be used in an amount of 0.001 parts by weight to 1 part by weight based on 100 parts by weight of super absorbent polymer particles. In this case, 100 parts by weight of the super absorbent polymer particles are based on the dried state. In addition, the content refers to the total amount of the inorganic material used.

For example, the inorganic material may be used in an amount of 0.005 parts by weight or greater, 0.01 parts by weight or greater, or 0.05 parts by weight or greater, greater than 0.5 parts by weight or greater, or 0.5 parts by weight or less, 0.4 parts by weight or less, or 0.2 parts by weight or less, less than 0.2 parts by weight or less based on 100 parts by weight of the super absorbent polymer particles. The content range of the inorganic material may be controlled to be within the above-described range to prepare a super absorbent polymer exhibiting excellent overall absorption physical properties.

When the surface cross-linking agent and the base polymer powder are mixed, water and methanol may be additionally mixed together and added. If water and methanol are added, there is an advantage in that the surface cross-linking agent may be evenly dispersed in the polymer composition. At this time, the content of water and methanol added may be appropriately adjusted to induce even dispersion of the surface cross-linking agent, to prevent aggregation of the polymer composition, and to optimize the surface penetration depth of the cross-linking agent.

In addition, when the surface cross-linking agent and the base polymer powder are mixed, a surfactant may be additionally mixed together and added, and examples of the surfactant include sucrose stearate, or the like. The surfactant may also perform the function of inducing even dispersion of the surface cross-linking agent and preventing aggregation of the polymer composition.

As described above, the super absorbent polymer including the base polymer powder and the surface cross-linked layer formed on the base polymer powder may absorb body fluids or water at a high speed, and also, may absorb a relatively large amount thereof in the beginning, and thus, may prevent a problem such as accumulation of the body fluids or the water without being absorbed, or the leakage thereof to the outside.

II. Method for Preparing Super Absorbent Polymer

A typical super absorbent polymer is prepared in the presence of an internal cross-linking agent and a polymerization initiator by cross-linking polymerizing a water-soluble ethylene-based unsaturated monomer to form a hydroxyl gel polymer, drying the hydroxyl gel polymer thus formed, and then pulverizing the same to a desired particle size, and typically, at this time, in order to facilitate the drying of the hydroxyl gel polymer, and to increase the efficiency of the pulverization process, a chopping process is performed in which the hydroxyl gel polymer is cut into particles having a size of several millimeters prior to the drying process. However, in the above-described chopping process, due to the adhesiveness of the hydrogel polymer, the hydrogel polymer is not pulverized to a micro-size particle level and becomes an aggregated gel form. When the hydrogel polymer in the form of the aggregated gel is dried, a plate-shaped dry body is formed, and in order to pulverize the same to a micro-size particle level, a pulverization process may be performed to reduce the adhesiveness of the multi-stage polymer, wherein there has been a problem in which a large amount of fine powder is generated in the process.

In order to solve the above-described problem, a method in which the separated fine powder is reused by being mixed with an appropriate amount of water to be re-assembled, and then being introduced in a chopping step or a pre-drying step. However, in the process of reusing the fine powder, there has been a problem of causing an increase in equipment load and/or energy usage. In addition, remaining fine powder that has not been classified even after the reuse causes degradation in the physical properties of a super absorbent polymer.

As a result of repeated research for solving the above-described problem, it has been confirmed that, instead of performing polymerization in a state in which an acid group of a water-soluble ethylene-based unsaturated monomer is neutralized as in a typical method for preparing a super absorbent polymer, if polymerization is first performed to form a polymer in a state in which an acid group is not neutralized, and the hydrogel polymer is micronized in the presence of a surfactant, followed by neutralizing an acid group of the polymer, the acid group of the polymer is neutralized to form a hydrogel polymer, and then the hydrogel polymer is micronized in the presence of a surfactant, or the acid group present in the polymer is neutralized at the same time as micronization, the surfactant is present in a large amount on the surface of the polymer, and is allowed to sufficiently serve to lower high adhesiveness of the polymer, thereby preventing the polymer from being excessively aggregated, and to control the aggregation status to a desired level.

Meanwhile, the super absorbent polymer according to the present disclosure may be implemented by adjusting components of the polymer, and the content, polymerization conditions, or pulverization process conditions thereof. For example, by adjusting the type and content of a monomer composition, and the type and amount of an internal cross-linking agent in a polymerization process, the type, introduction amount, and introduction timing of a surfactant, and the type, introduction amount, and introduction timing of a neutralizing agent in micronization and neutralization steps, the type, rotation speed, hole size, and the number of times of micronization of a micronization device, the composition and content, or the like of a surface cross-linking solution, it is possible to control the content of carbon present on the surface of a super absorbent polymer as in the present disclosure.

Particularly, when proceeding with a micronization method and a surface cross-linking method, it is possible to control the content of carbon present on the surface of the super absorbent polymer as in the present disclosure by controlling the application of an ultra-fine pulverization process, or the component and content of a surface cross-linking solution, or by controlling both the application of an ultra-fine pulverization process, and the component and content of a surface cross-linking solution. The control of the ultra-fine pulverization process and the component and content of a surface cross-linking solution will be described later.

Hereinafter, a method for preparing a super absorbent polymer according to one aspect will be described in more detail for each step.

Step 1: Polymerization Step

First, polymerization is performed on a monomer composition including a water-soluble ethylene-based unsaturated monomer having an acid group and an internal cross-linking agent to prepare base polymer powder in which the water-soluble ethylene-based unsaturated monomer having an acid group and the internal cross-linking agent are cross-linking polymerized.

The above-described step may include mixing the water-soluble ethylene-based unsaturated monomer having and acid group, the internal cross-linking agent, and a polymerization initiator to prepare a monomer composition and polymerizing the monomer composition to form a polymer.

Here, the same contents described with reference to the super absorbent polymer of Section I above may be equally applied to each component.

According to an aspect of the present disclosure, a polymer is formed by performing polymerization first in a state in which the acid group of the water-soluble ethylene-based unsaturated monomer is not neutralized.

The water-soluble ethylene-based unsaturated monomer (e.g., acrylic acid) in a state in which the acid group is not neutralized is in a liquid state at room temperature and has high miscibility with a solvent (water), thereby being present in a mixed solution state in a monomer composition. However, the water-soluble ethylene-based unsaturated monomer in which the acid group is neutralized is in a solid state at room temperature, has different solubility depending on the temperature of a solvent (water), and has lower solubility as a lower temperature.

The water-soluble ethylene-based unsaturated monomer in which the acid group is not neutralized has higher solubility or miscibility with respect to a solvent (water) than a monomer in which an acid group is neutralized, and thus, is not precipitated even at a low temperature, and accordingly, is advantageous in long-term polymerization at a low temperature. Accordingly, it is possible to stably form a polymer having a higher molecular weight and a uniform molecular weight distribution by performing long-term polymerization using the water-soluble ethylene-based unsaturated monomer in a state in which the acid group is not neutralized.

In addition, it is possible to form a polymer with a longer chain, so that an effect of reducing the content of extractable contents present in a uncross-linked state due to incomplete polymerization or cross-linking may be achieved, and accordingly, it is suitable to implement the content of extractable contents measured after free swelling the above-described super absorbent polymer of the present disclosure for 1 hour in water having an electrical conductivity of 100 μS/cm to 130 μS/cm to be within a desired range.

In addition, as described above, if polymerization is first performed to form a polymer in a state in which an acid group of a monomer is not neutralized, and the polymer is neutralized, and then micronized in the presence of a surfactant, micronized in the presence of a surfactant and then polymerized, or micronized simultaneously with neutralizing an acid group present in the polymer, the surfactant is present in a large amount on the surface of the polymer to sufficiently serve to lower the adhesiveness of the polymer.

According to an aspect of the present disclosure, the step of performing polymerization on the monomer composition to form a polymer may be performed for 1 hour or more in a batch-type reactor.

In a typical method for preparing a super absorbent polymer, the polymerization method is largely divided into thermal polymerization and photopolymerization depending on a polymerization energy source, and typically, the thermal polymerization may be performed in a reactor with a stirring shaft such as a kneader, and the photopolymerization may be performed in a flat-bottomed vessel.

Meanwhile, if the polymerization is performed as continuous polymerization, for example, if polymerization is performed in a reactor having a conveyor belt, a new monomer composition is supplied to the reactor as a polymerization product moves, thereby achieving polymerization in a continuous manner, so that polymers having different polymerization rates are mixed, and accordingly, it is difficult to achieve even polymerization in the entire monomer composition, which may cause degradation in the overall physical properties.

However, according to an aspect of the present disclosure, polymerization is performed in a stationary manner in a batch reactor, so that there is less risk of mixing polymers with different polymerization rates, and accordingly, a polymer having uniform quality may be obtained.

In addition, the above-described polymerization step is performed in a batch reactor having a predetermined volume, and performs a polymerization reaction for a long period of time, for example, 1 hour or more, 3 hours or more, or 6 hours or more, compared to a case in which polymerization is performed in a continuous manner in a reactor having a conveyor belt. Despite the long polymerization reaction time as described above, since polymerization is performed on a water-soluble ethylene-based unsaturated monomer in an unneutralized state, the monomer is not easily precipitated even when the polymerization is performed for a long period of time, and therefore, it is advantageous for long-term polymerization.

Meanwhile, the polymerization in a batch reactor of the present disclosure is performed by a thermal polymerization method, so that a thermal polymerization initiator is used as the polymerization initiator, and the description of the corresponding component is the same as described above.

Steps 2 and 3: Micronization and Neutralization Steps

Next, a step of micronizing the hydrogel polymer in the presence of a surfactant to prepare a mixture including the micronized hydrogel polymer (Step 2) is included.

The above-described micronization step is a step of micronizing the polymer in the presence of a surfactant, and is a step in which micronization and aggregation of the polymer into a size of tens to hundreds of micrometers are simultaneously performed, rather than chopping the polymer to a millimeter size.

That is, it is a step of imparting appropriate adhesiveness to the polymer, thereby preparing secondary aggregated particles in the shape in which primary particles micronized to a size of tens to hundreds of micrometers are aggregated. Hydrous super absorbent polymer particles, which are the secondary aggregated particles prepared in the above-described step have a normal particle size distribution and a greatly increased surface area, so that the absorption rate may be significantly improved.

Meanwhile, if ultra-fine pulverization is performed at a rotation speed of 500 rpm to 4,000 rpm by applying high-intensity mechanical shearing force in the micronization step, it is possible to form aggregated hydrogel particles having finer micropores.

At this time, if ultra-fine pulverization is performed at a rotation speed of 500 rpm to 4,000 rpm, high-intensity mechanical shearing force is applied, so that micropores of 100 μm or less are easily formed on the polymer, and accordingly, the surface roughness is increased, and the total surface area of the polymer is significantly increased by the pores formed inside and outside the polymer particles. Since the micropores are formed in a shape having stability compared to pores formed using a foaming agent in the polymerization step, the degree of fine powder generation due to the corresponding pores may be significantly reduced in the following process. Super absorbent polymer particles prepared in the above-described step have a significantly increased surface area, so that the vortex time may be significantly improved, and accordingly, it is suitable to implement the content of extractable contents measured after free swelling the above-described super absorbent polymer of the present disclosure for 1 hour in water having an electrical conductivity of 100 μS/cm to 130 μS/cm to be within a desired range.

The ultra-fine pulverization process is performed at a rotation speed of 500 rpm to 4,000 rpm, and if the rotation speed of the above-described process is less than 500 rpm, it is difficult to form sufficient pores to a desired degree, so that it is difficult to expect quick vortex time, and it is difficult to secure a desired level of productivity. In addition, if the rotation speed is greater than 4,000 rpm, polymer chains may be damaged due to excessive shearing force, and accordingly, the content of extractable contents is increased, so that overall physical properties of a prepared super absorbent polymer may be slightly degraded. For example, the ultra-fine pulverization process may be performed at 1,000 rpm to 3,500 rpm, or 2,000 rpm to 3,000 rpm. In the above-described range, it is easy to form desired micropores without any problem described above.

According to an aspect of the present disclosure, the micronization step is performed by a micronization device, and the micronization device may include a body part having a transfer space thereinside, in which a polymer is transferred, a screw member rotatably installed inside the transfer space to move a polymer, a drive motor providing a rotational driving force to the screw member, a cutter member installed in the body part and pulverizing the polymer, and a perforated plate discharging the polymer pulverized by the cutter member to the outside of the body part and having a plurality of holes.

At this time, the size of the hole provided in the perforated plate of the micronization device may be 1 mm to 25 mm, 5 mm to 20 mm, or 5 mm to 15 mm.

As described above, when the polymer mixed with the surfactant is micronized using the micronization device while controlling aggregation, a smaller particle size distribution is implemented, so that the following drying and pulverization processes may be performed under milder conditions, and accordingly, it is possible to improve the physical properties of the super absorbent polymer while preventing the generation of fine powder, and if the ultra-fine pulverization is performed, appropriate micropores are simultaneously formed on the surface of the polymer, so that absorption rate may be improved through the improvement in the surface area.

The micronization step may be performed one or more times, and or, may be performed 1 time to 6 times, 1 time to 4 times, or 1 time to 3 times. The above-described step may be performed using a plurality of micronization devices, or may be performed using a single micronization device including a plurality of perforated plates and/or a plurality of cutter members, or some devices of the plurality of micronization devices may include a plurality of perforated plates and/or a plurality of cutter members.

According to an aspect of the present disclosure, a surfactant may be additionally used in the above-described micronization step, and accordingly, aggregation between polymer particles may be effectively controlled to lower the load of the device used in the pulverization process, so that productivity may be further improved.

The surfactant may be selected from compounds represented by Formula 2-1 to Formula 2-14 below, but is not limited thereto.

[Chemical Formula 2-1]

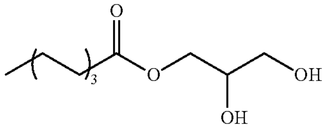

[Chemical Formula 2-2]

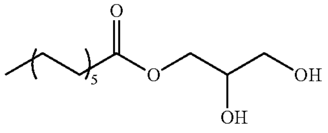

[Chemical Formula 2-3]

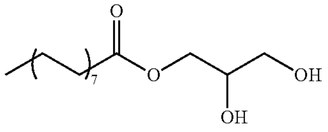

-continued

[Chemical Formula 2-4]

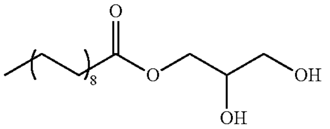

[Chemical Formula 2-5]

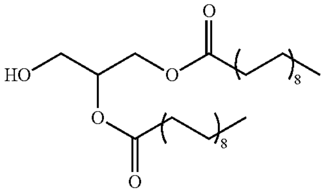

[Chemical Formula 2-6]

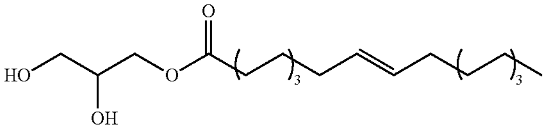

[Chemical Formula 2-7]

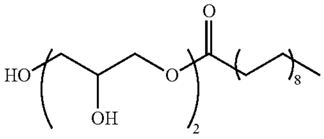

[Chemical Formula 2-8]

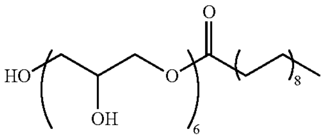

[Chemical Formula 2-9]

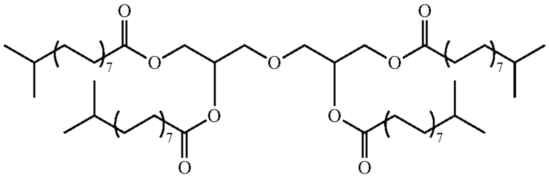

[Chemical Formula 2-10]

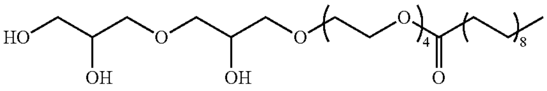

[Chemical Formula 2-11]

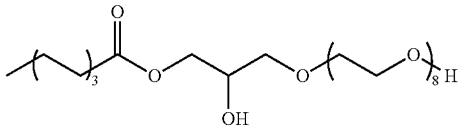

[Chemical Formula 2-12]

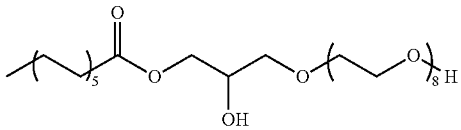

[Chemical Formula 2-13]

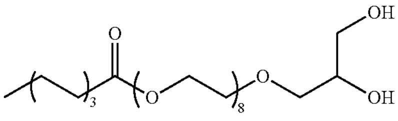

-continued

[Chemical Formula 2-14]

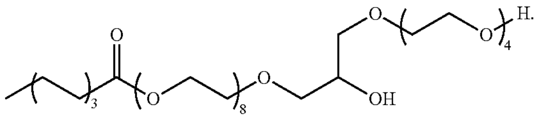

According to an aspect of the present disclosure, the surfactant may be glycerol monolaurate (GML), but is not limited thereto.

Meanwhile, the amount of the surfactant to be used is not particularly limited, but the surfactant may be used in an amount of 0.06 g to 0.48 g per 1,000 g of the hydrogel polymer depending on productivity securing or the load of a device. If the surfactant is used too little, the surfactant is not evenly adsorbed onto the surface of the polymer, so that particles may re-aggregated after pulverization, or due to much sharing between the surfactant and the polymer, absorption performance such as centrifuge retention capacity and absorbency under pressure may be degraded. Meanwhile, if the surfactant is used too much, due to a decrease in surface tension, the overall physical properties of a finally prepared super absorbent polymer may be degraded.

Therefore, for example, the surfactant may be used in an amount of 0.06 g or more, 0.1 g or more, or 0.2 g or more, and 0.48 g or less, 0.45 g or less, or 0.4 g or less per 1,000 g of the hydrogel polymer, and accordingly, it is easy to control the content of extractable contents measured after free swelling the above-described super absorbent polymer of the present disclosure for 1 hour in water having an electrical conductivity of 100 μS/cm to 130 μS/cm to be within a desired range.

A method for mixing a surfactant with a polymer is not particularly limited as long as it is a method capable of evenly mixing the surfactant with the polymer, and may be appropriately adopted and used. Specifically, the surfactant may be mixed in a dry manner, or dissolved in a solvent and then mixed in a solution state, or the surfactant may be melted and then mixed.

Among the above, the surfactant may be, for example, mixed in a solution state of being dissolved in a solvent. At this time, as the solvent, all types of solvents may be used whether it is an inorganic solvent or organic solvent, but considering the ease of a drying process and the cost of a solvent recovery system, water is most suitable. In addition, the solution may be prepared by mixing the surfactant and the polymer in a reaction tank, putting the polymer in a mixer and spraying the solution thereon, or mixing the polymer and the solution by continuously supplying the same to a continuously operating mixer.

Meanwhile, if the surfactant is mixed in a solution state of being dissolved in water, the surfactant may be diluted as an aqueous solution having a concentration of about 0.01% to 10% and used.

For example, if the surfactant is to be used in an amount of 0.1 g per 1,000 g of the hydrogel polymer, 100 g of an aqueous solution having a concentration of 0.1% may be used by dissolving 0.1 g of the surfactant in 99.9 g of water. Alternatively, 10 g of an aqueous solution having a concentration of 1% may be used by dissolving 0.1 g of the surfactant in 9.9 g of water.

That is, if the same amount of the surfactant is used, the water content may be adjusted to prepare an aqueous solution with a desired concentration, and the concentration may be appropriately adjusted in consideration of the physical properties of a super absorbent polymer to be finally prepared.

Meanwhile, if the surfactant is hydrophobic, and thus, has very low solubility with respect to water, the surfactant may be mixed with the polymer in a dry manner, or the surfactant may be added to water such that the surfactant is used in a state of being dispersed in water. For example, if the surfactant is dry-mixed in a powder form and dispersed in the polymer, the degree of dispersion is very low, so that the surfactant may be used by being dispersed in water to be evenly coated on the surface.

According to an aspect of the disclosure, a step of neutralizing at least a portion of the acid group of the polymer (Step 3) is performed, and the above-described micronization of Step 2 and the neutralization of Step 3 may be performed sequentially, alternately, or simultaneously.

That is, a neutralizing agent may be introduced to a polymer to polymerize the acid group first, and then a surfactant may be introduced to the polymerized polymer to micronize the polymer mixed with the surfactant (perform in the order of Step 3→Step 2), or a neutralizing agent and a surfactant may be simultaneously introduced to a polymer to neutralize and micronize the polymer (simultaneously perform Steps 2 and Step 3). Alternatively, a surfactant may be introduced first and then a neutralizing agent may be introduced later (perform in the order of Step 2→Step 3). Alternatively, a neutralizing agent and a surfactant may be alternately introduced. Alternatively, a surfactant may be introduced first for micronization, and then a neutralizing agent may be introduced for neutralization, and additionally, a surfactant may be further added to the neutralized hydrogel polymer to further perform the micronization process.

Here, if the neutralization is separately performed independently from the micronization of Step 2, the neutralization may be performed in such a manner that an additive is introduced while the polymer is being pulverized. More specifically, a screw-type extruder including a perforated plate having a plurality of holes may be used. The screw-type extruder is a device in which pulverization is performed in a mild condition compared to the micronization device used in the micronization step described above, and the rotation speed of the extruder may be about 150 rpm to about 500 rpm, and the hole of the perforated plate may be about 3 mm to 25 mm in size, but the present disclosure is not limited thereto.

The rotation speed of the screw-type extruder and the hole size of the perforated plate affect the discharge state of a super absorbent polymer discharged from the extruder, and depending on the discharge state, the particle shape of the super absorbent polymer may change.

Particularly, by adjusting the rotation speed of the screw-type extruder at 150 rpm to 500 rpm, it is possible to control the content of extractable contents measured after free swelling the above-described super absorbent polymer of the present disclosure for 1 hour in water having an electrical conductivity of 100 μS/cm to 130 μS/cm to be within a desired range.

At this time, as the neutralizing agent, a basic material such as sodium hydroxide, potassium hydroxide, ammonium hydroxide, or the like, which is capable of neutralizing an acid group, may be used.

In addition, the degree of neutralization, which refers to the degree of neutralization of an acid group included in the polymer by the neutralizing agent may be 50 mol % to 90 mol %, 60 mol % to 85 mol %, 65 mol % to 85 mol %, or 65 mol % to 80 mol %. The range of the degree of neutralization may vary depending on final physical properties, and by adjusting the degree of neutralization, it is possible to adjust absorption rate and absorption performance.

At this time, if the degree of neutralization is too high, the absorbency of the super absorbent polymer may decrease, and the concentration of the carboxyl group on the surface of the particle is too low, making it difficult to properly perform surface cross-linking in a subsequent process, so that absorption properties under pressure or permeability may be reduced. On the other hand, if the degree of neutralization is too low, the polymer may have significantly reduced absorption power, and may exhibit the same property as that of elastic rubber, which is difficult to handle.

Meanwhile, in order to neutralize the entire polymer evenly, it may be preferable to leave a certain time lag between the introduction of the neutralizing agent and the micronization process.

Step 4: Drying Step

Next, a step (Step 4) of drying the micronized and neutralized polymer to prepare base polymer powder is performed.

The above-described step is a step in which at least a portion of an acid group of a polymer is neutralized, and moisture of the base polymer powder, which is a polymer obtained by micronizing the polymer, is dried.

In a typical method for preparing a super absorbent polymer, the drying step is performed such that the moisture content of base polymer powder is to be about 4 wt % to 20 wt %, about 4 wt % to about 15 wt %, or about 6 wt % to about 13 wt %. However, the present disclosure is not limited thereto.

Step 4 above may be performed by fixed-bed type drying, moving type drying, or a combination thereof.

According to an aspect of the disclosure, Step 4 above may be performed by fixed-bed type drying.

The fixed-bed type drying refers to a method in which a material to be dried is suspended on a floor such as a perforated iron plate which allows air to pass through, and then hot air passes through the material from the bottom to the top to dry the material.

The fixed-bed type drying performs drying in a plate-shape manner without the flow of particles, so that it is difficult to achieve uniform drying with a simple flow of hot air. Therefore, the fixed-bed type drying requires a delicate adjustment of hot air and temperature in order to obtain a dried body with a uniform high moisture content. In the present disclosure, through a method for changing the direction of hot air from downward to upward, a plate-shaped dried body is prevented from bending during drying, thereby preventing the hot air from escaping. In addition, the drying temperature was changed for each section to adjust the upper layer-middle layer-lower layer inside the dried body to be uniformly dried with a moisture content deviation of 5% or less.

As a device capable of performing drying by the fixed-bed type drying, a belt-type dryer or the like may be used, but the present disclosure is not limited thereto.

In the case of the fixed-bed type drying step, the drying process may be performed at a temperature of about 80° C. to about 200° C., or 90° C. to 190° C. or 100° C. to 180° C. If the drying temperature is below 80° C., the drying time may become excessively long, and if the drying temperature is excessively high, which is above 200° C., a super absorbent polymer having a moisture content lower than a desired moisture content may be obtained. Meanwhile, the drying temperature may mean the temperature of hot air which is used or the internal temperature of a device during the drying process.

According to an aspect of the present disclosure, Step 4 above may be performed by moving type drying.

The moving type drying refers to a method for drying a dried body by mechanically stirring the same during drying. At this time, the direction in which hot air passes through a material may be the same as or different from the circulation direction of the material. Alternatively, the material may be dried by circulating inside a dryer and passing through a heat medium fluid (heat oil) from a separate pipe outside the dryer.

As a device capable of performing drying by the above-described moving type drying, a horizontal-type mixer, a rotary kiln, a paddle dryer, a steam tube dryer, a moving type drier commonly used, or the like may be used.

In the case of the moving type drying step, the drying process may be performed at a temperature of about 100° C. to about 300° C., or 120° C. to 280° C. or 150° C. to 250° C. If the drying temperature is excessively low, which is below 100° C., the drying time may become excessively long, and if the drying temperature is excessively high, which is above 300° C., super absorbent polymer chains may be damaged, which may degrade the overall physical properties, and also, a super absorbent polymer having a moisture content lower than a desired water content may be obtained.

Step 5: Pulverization Step

Next, a step of pulverizing the dried base polymer powder is performed.

Specifically, the pulverization step may be performed by pulverizing the dry base polymer powder to have a particle size of normal particle level, i.e., a particle diameter of 150 μm to 850 μm.

A pulverizer to be used for the above-described purpose may specifically be a vertical pulverizer, a turbo cutter, a turbo grinder, a rotary cutter mill, a cutter mill, a disc mill, a shred crusher, a crusher, a chopper, a disc cutter, or the like, but is not limited to the above-described examples.

Alternatively, as the pulverizer, a pin mill, a hammer mill, a screw mill, a roll mill, a disc mill, a jog mill, or the like may be used, but the pulverizer is not limited to the above-described examples.

Meanwhile, in the preparation method of the present disclosure, super absorbent polymer particles having a small particle size distribution may be implemented in the micronization step compared to a typical chopping step, and since the moisture content is maintained relatively high after drying, even if pulverization is performed under mild conditions with relatively low pulverization power, a super absorbent polymer having a very high content of particles with a normal particle size of 50 μm to 850 μm may be obtained, and the fine powder generation rate may be greatly reduced.

The super absorbent polymer particles prepared as described above may include super absorbent polymer particles having a particle size of 150 μm to 850 μm, i.e., normal particles, in an amount of 80 wt % or greater, 85 wt % or greater, 89 wt % or greater, 90 wt % or greater, 92 wt % or greater, 93 wt % or greater, 94 wt % or greater, or 95 wt % or greater based on the total weight. The particle size of the above-described polymer particles may be measured according to the method of EDANA WSP 220.3 of the European Disposables and Nonwovens Association (EDANA) standards.

In addition, the super absorbent polymer particles may contain fine powder having a particle diameter of less than 150 μm in an amount of about 20 wt % or less, about 18 wt % or less, about 15 wt % or less, about 13 wt % or less, about 12 wt % or less, about 11 wt % or less, about 10 wt % or less, about 9 wt % or less, about 8 wt % or less, or about 5 wt % or less based on the total weight. This is in contrast to having fine powder in an amount of greater than about 20 wt % to about 30 wt % when a super absorbent polymer is prepared according to a typical preparation method.

Additive Introduction Step

Meanwhile, according to an aspect of the disclosure, prior to the drying step (Step 4), a step of introducing an additive to the micronized and neutralized polymer may be further included.

The process of introducing an additive is a process for improving physical properties by using an additional additive within a range in which a desired effect is not inhibited, and the type of the additive is not particularly limited, wherein, for example, a polymerization initiator for removing residual monomers, a permeability enhancer for improving absorption properties, a fine powder anti-Caking agent for recirculating generated fine powder, a fluidity enhancer, an antioxidant, a neutralizing agent, a surfactant, or the like may be used, but the additive is not limited thereto.

The additive introduction step may be performed simultaneously with Step 2, simultaneously with Step 3, after Step 2 and Step 3, or in at least one of the above-described steps. The additive introduction step may be performed a plurality of times if necessary, and may also be performed one or more times in each step.

If the additive introduction step is separately performed independently from Step 2 and Step 3, that is, if performed after Step 2 and Step 3 and before Step 4, the additive introduction step may be performed in a manner in which an additive is introduced while the polymer is being pulverized.

The pulverization of Step 5 described above may be equally applied to the pulverization above, and in the pulverization step, an additive may be introduced once or a plurality of times and mixed with the polymer.

Classification Step

Next, after the step of pulverizing the base polymer powder (Step 5), a step of classifying the pulverized super absorbent polymer particles according to the particle size may be further included.

Step 6: Surface Cross-Linking Step

In addition, a step of forming a surface cross-linked layer on at least a portion of the surface of the base polymer particle in the presence of a surface cross-linking agent after pulverizing (Step 5) and/or classifying the base polymer powder may be further included. By the above-described step, a cross-linked polymer included in the base polymer powder may be further cross-linked by means of the surface cross-linking agent, so that the surface cross-linked layer may be formed on at least a portion of the surface of the base polymer powder.

The same contents described above with reference to a surface cross-linking agent may be equally applied to the surface cross-linking agent. In addition, the same contents described above with reference to water, methanol, and a surfactant may all be equally applied to the water, methanol, and surfactant added when the surface cross-linking agent and the base polymer powder are mixed.

In addition, there is no limitation on a method for mixing the surface cross-linking agent with the base polymer powder. For example, a method in which a composition including a surface cross-linking agent and base polymer powder is introduced into a reaction tank and mixed, a method in a surface cross-linking agent is sprayed on the composition, a method in which a polymer composition and a surface cross-linking agent are continuously supplied to a continuously operating mixer, and the like may be used.

The surface cross-linking process may be performed at a temperature of about 80° C. to about 250° C. More specifically, the surface cross-linking process may be performed at a temperature of about 100° C. to about 220° C., or about 120° C. to about 200° C. for about 20 minutes to about 2 hours, or about 40 minutes to about 80 minutes. When the above-described surface cross-linking process conditions are satisfied, the surface of the super absorbent polymer particles are sufficiently cross-linked, so that the absorbency under pressure may increase.

The means for raising the temperature for the surface cross-linking reaction is not particularly limited.

A heat medium may be supplied, or a heat source may be directly supplied for heating. At this time, the types of the heat medium that can be used may include steam, hot air, and a heated fluid such as hot oil, but are not limited thereto, and the temperature of a supplied heat medium may be appropriately selected in consideration of the means of the heat medium, the temperature raising rate, and the temperature raising target temperature. Meanwhile, the heat source that can be directly supplied may include heating through electricity, or heating through gas, but is not limited to the above-described examples.

Post-Treatment Step

According to an aspect of the present disclosure, after the step of forming the surface cross-linked layer on at least a part of the surface of the base polymer powder, the method may be performed by further including any one or more steps among a cooling step of cooling the super absorbent polymer particles having the surface cross-linking layer formed thereon, an adding-water step of adding water to the super absorbent polymer particles having the surface cross-linked layer formed thereon, and a post-treatment step of introducing an additive to the super absorbent polymer particles having the surface cross-linked layer formed thereon. At this time, the cooling step, the adding-water step, and the post-treatment step may be performed sequentially or simultaneously.

In the adding-water step, water or salt water may be used, through which the amount of remnants generated may be controlled. The amount of water to be used may be appropriately adjusted in consideration of a desired moisture content of a final product, and for example, the water may be used in an amount of 0.1 wt % to 10 wt %, 0.5 wt % to 8 wt %, or 1 wt % to 5 wt % based on the absorbent polymer, but is not limited thereto.

In addition, after the adding-water step, an aging step may be further performed.

If salt water is used in the adding-water step, due to the conductivity of the salt water, the solution absorption rate relatively decreases, which allows the salt water to evenly spread during the aging step, thereby making it possible to achieve even absorption with respect to the absorbent polymer. In the aging step, a commonly used method may be applied without particular limitation, and for example, the aging step may be performed at 100° C. or lower, 80° C. or lower, or at 50° C. or lower for 10 minutes to 1 hour using a rotary stirring facility.

The additive introduced in the post-treatment step may be a surfactant, an inorganic salt, a permeability enhancer, an anti-Caking agent, a fluidity enhancer, an antioxidant, or the like, but the present disclosure is not limited thereto.

By selectively performing the cooling step, the adding-water step, and the post-treatment step, the moisture content of a final super absorbent polymer may be increased by controlling the generation of remnants, and a high-quality super absorbent polymer product may be prepared.

Hereinafter, through specific aspects of the present disclosure, actions and effects of the present disclosure will be described in more detail. However, these aspects are only presented as examples of the present disclosure, and the scope of the present disclosure is not limited thereby.

EXAMPLES

1) Example 1

Step 1: Polymerization Step-Preparation of Hydrogel Polymer

In a 2 L glass container equipped with a stirrer and a thermometer, 1000 g of acrylic acid, 2.5 g of pentaerythritol triallyl ether (PETTAE) as an internal cross-linking agent, and 2260 g of water were stirred and mixed. At this time, the reaction temperature was maintained at 5° C. Nitrogen was introduced into the glass container containing the mixture at 1,000 cc/min for 1 hour to substitute the inside of the glass container with nitrogen conditions. Thereafter, as a polymerization initiator, 13.0 g of 0.3% hydrogen peroxide aqueous solution, 15.0 g of 1% ascorbic acid aqueous solution, and 30.0 g of 2% 2,2'-azobis chloride amidinopropane dihydrochloric acid aqueous solution were introduced, and at the same time, as a reducing agent, 15.0 g of 0.01% iron sulfate aqueous solution was added and mixed to initiate polymerization. A polymerization reaction started in the mixture and the temperature of the polymer reached 85° C., and then the polymerization was performed in an oven at 90±2° C. for about 6 hours to prepare a hydrogel polymer.

Steps 2 and 3: Micronization and Neutralization Steps 1000 g of the hydrogel polymer obtained in Step 1 above and 0.1 g of glycerol monolaurate (GML) were dissolved in water at 60° C. or higher and introduced in the form of an aqueous solution into a cylindrical pulverizer. Thereafter, using a high-speed rotary-type chopper (F-150/Karl Schnell Co.) mounted inside the cylindrical pulverizer, the mixture was pushed into a perforated plate with a plurality of 10-mm holes at a rotation speed of 1200 rpm. Subsequently, the mixture was further pushed into a perforated plate with a plurality of 10 mm holes at a rotational speed of 2500 rpm to obtain a hydrogel polymer in the form of pulverized gel. Thereafter, using a screw-type extruder mounted inside the cylindrical pulverizer, the hydrogel polymer in the form of pulverized gel was pushed three times into a perforated plate with a plurality of 6-mm holes at a rotation speed of 250 rpm to obtain hydrous super absorbent polymer particles. Specifically, the hydrogel polymer was pushed into the perforated plate while introducing 400 g of 32% NaOH aqueous solution during the first pass-through, and pushed into the perforated plate while introducing 42.8 g of 0.5% $Na_2S_2O_8$ aqueous solution (SPS aqueous solution) during the second pass-through.

During the third pass-through, the hydrogel polymer was passed through the perforated plate without the introduction of an additive.

Step 4: Drying step

The super absorbent polymer particles obtained as a result of the above-described pulverization were placed on a porous plate capable of transferring air volume up and down, and dried at 120° C. for 40 minutes using an air-flow oven. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes, thereby uniformly drying the hydrous super absorbent polymer particles to obtain a dried body.

Step 5: Pulverization and Classification Step

The dried body was pulverized using a pulverizer (GRAN-U-LIZER™, MPE), and then classified using a standard mesh sieve of the ASTM standards to obtain base polymer powder having a size of 150 μm to 850 μm.

Step 6: Surface Cross-Linking Step

Next, as described in Table 1 below, with respect to 100 g of the base polymer powder, a surface cross-linking agent aqueous solution containing 4 g of water, 6 g of methanol, 0.08 g of ethyleneglycol diglycidyl ether (EJ-1030S), 0.1 g of propylene glycol, 0.2 g of aluminum sulfate, and 0.1 g of silica particles (Aerosil 200) was introduced and mixed. At this time, the mixing was performed such that the surface cross-linking aqueous solution was to be evenly distributed on the super absorbent polymer powder.

Subsequently, the base polymer powder mixed with the surface cross-linking solution was placed into a surface cross-linking reactor and subjected to a surface cross-linking reaction to obtain a surface cross-linked super absorbent polymer.

Specifically, in the above-described surface cross-linking reactor, the base polymer powder underwent the surface cross-linking reaction at 140° C. for 50 minutes.

After the above-described surface cross-linking step, the surface cross-linked super absorbent polymer was classified using a standard mesh sieve of ASTM standards to prepare a super absorbent polymer having a particle diameter of 150 μm to 850 μm.

2) Examples 2 to 4 and Comparative Examples 1 to 4

Super absorbent polymers of Examples 2 to 4 and Comparative Examples 1 to 4 were prepared in the same manner as in Example 1, except that the component and content of a surface cross-linking agent aqueous solution used in Step 6 of Example 1 were prepared as described in Table 1 below.

3) Comparative Example 5

In Steps 2 and 3 of Example 1, instead of using the high-speed rotary-type shopper (F-150/Karl Schnell Co.), the hydrogel polymer prepared in Step 1 above was cut into a size of 5 cm in width and 5 cm in length, and the hydrogel polymer was pulverized using a screw-type chopper (meat chopper) equipped with a perforated plate including a plurality of holes. At this time, the rotation speed of the screw-type chopper was 250 rpm, and the hole size of the perforated plate was 10 mm.

In addition, in Example 4, a surface cross-linking aqueous solution was used to proceed with Step 6 of Example 1.

Other than that, a super absorbent polymer of Comparative Example 5 was prepared in the same manner as in Example 1.

TABLE 1

| | A | B | C | D | E | F | G |
|---|---|---|---|---|---|---|---|
| Example 1 | 4 | 6 | 0.08 | 0.1 | 0.2 | — | 0.1 |
| Example 2 | 4 | 6 | 0.08 | 0.1 | — | 0.1 | 0.15 |
| Example 3 | 4 | 6 | 0.1 | 0.1 | — | 0.07 | 0.1 |
| Example 4 | 5 | 6 | 0.08 | 0.1 | 0.2 | 0.03 | 0.25 |
| Comparative Example 1 | 5 | 6 | 0.1 | 0.1 | 0.4 | 0.03 | 0.1 |
| Comparative Example 2 | 5 | 6 | 0.1 | 0.1 | 0.1 | 0.2 | 0.05 |
| Comparative Example 3 | 6 | 6 | 0.1 | 0.1 | — | — | 0.25 |
| Comparative Example 4 | 6 | 6 | 0.15 | 0.1 | 0.2 | — | 0.15 |
| Comparative Example 5 | 5 | 6 | 0.08 | 0.1 | 0.2 | 0.03 | 0.25 |

The materials of A to G in Table 1 above are as follows, and in Table 1 above, '-' represents a component not included in the surface cross-linking agent aqueous solution, and the unit of each number is g.

A: Water
B: Methanol
C: Ethyleneglycol diglycidyl ether
D: Propylene glycol
E: Aluminum sulfate
F: Sucrose stearate
G: Silica Table 1 above may refer to the amount of a material used per 100 g of the base polymer powder.

<Experimental Example 1>—XPS Analysis

The super absorbent polymers prepared in Examples and Comparative

Examples were subjected to XPS analysis on the surface of the polymer in the same manner as described above to perform qualitative analysis and quantitative analysis on the surface of the polymer.

A super absorbent polymer (SAP) with a size of at least 400 μm×800 μm was attached to copper (Cu) foil, and then fixed with carbon tape and loaded into XPS equipment (Step 1). After the loading, when the degree of vacuum in a load lock was sufficiently lowered (at least $1\times10^{-7}$ mBar), the super absorbent polymer was moved to an analysis chamber (Step 3). Subsequently, qualitative analysis was performed to identify the type of an element detected through a survey scan in the analysis chamber. After the qualitative analysis, quantitative analysis was performed to confirm the content by element (atomic %, at %) at 3 points through a narrow scan of each element detected through the survey scan.

The conditions for the survey scan and narrow scan are as follows.

[Survey Scan Conditions]

XPS model: K-Alpha+ (Thermo Fisher Scientific Inc.)
X-ray Source: Al Kα (1486.68 eV)
Analyzer: CAE mode
X-ray spot size (Beam size): 400 μm×800 μm
Charge compensation: FG03 mode (150 μA, 1.0 V)
Scan range: −10~ 1360 eV
Step size: 1 eV
Per point dwell time: 20 ms
Number of scans: 10
Pass energy: 200 e V
Depth profile: As-received analysis, Ion Gun not used

[Narrow Scan Conditions]

XPS model: K-Alpha+ (Thermo Fisher Scientific Inc.)

X-ray Source: Al Kα (1486.68 eV)

Analyzer: CAE mode

X-ray spot size (Beam size): 400 μm×800 μm

Charge compensation: FG03 mode (150 μA, 1.0 V)

Scan range: 10~ 40 e V

Step size: 0.1 eV

Per point dwell time: 50 ms

Number of scans: 10

Pass energy: 50 e V

Depth profile: As-received analysis, Ion Gun not used

The results are shown in Table 2 below.

TABLE 2

| | C | O | Na | Al | Si | S |
|---|---|---|---|---|---|---|
| Example 1 | 53.5 | 37.8 | 2.8 | 1.2 | 4.1 | 0.6 |
| Example 2 | 57.3 | 31.5 | 3.5 | 0 | 7.7 | 0 |
| Example 3 | 53.9 | 35.1 | 3.7 | 0 | 7.3 | 0 |
| Example 4 | 35.1 | 45.2 | 5.3 | 0.9 | 11.1 | 2.4 |
| Comparative Example 1 | 41.7 | 39.6 | 4.8 | 3.6 | 8.2 | 2.1 |
| Comparative Example 2 | 59.9 | 31.5 | 3.5 | 0.8 | 4 | 0.3 |
| Comparative Example 3 | 32.1 | 48.1 | 3.8 | 0 | 16 | 0 |
| Comparative Example 4 | 38.2 | 45.8 | 2.7 | 1.5 | 9.6 | 2.2 |
| Comparative Example 5 | 52.4 | 37.7 | 5.1 | 3 | 0 | 1.8 |

The unit of the numbers described in Table 2 above is atomic % (at %).

In addition, in order to obtain the content of carbon included in each of C—C, C═O, C═O, and O—C═O bond structures related to carbon, fitting was performed on a C Is spectrum secured through the narrow scan in Step 3 above. The fitting process is conducted using the Lorentzian/Gaussian mix method (30%: 70%). Through the above, an area ratio with respect to each of the C—C, C═O, C═O, and O—C═O bond structures related to carbon was calculated.

The content of carbon in each of the bond structures related to carbon is calculated using the area ratio and the content of carbon confirmed through the narrow scan.

Specifically, the calculation was performed using Mathematical formula 1 below.

$X_A$=C content(atomic %)×(A area ratio/total area ratio) [Mathematical Formula 1]

In Mathematical formula 1 above, the A represents one of C—C, C═O, C═O, and O—C═O bond structures related to carbon present on the surface of a super absorbent polymer, and the total area ratio represents an area ratio of all carbon elements with respect to all elements present on the surface of the super absorbent polymer.

The results are shown in Table 3 below.

TABLE 3

| | C—C | C—O | C═O | O—C═O | C | C═O + O—C═O |
|---|---|---|---|---|---|---|
| Example 1 | 17.1 | 26.2 | 7.1 | 3.1 | 53.5 | 10.2 |
| Example 2 | 42.7 | 6 | 4.3 | 4.3 | 57.3 | 8.6 |
| Example 3 | 29 | 15 | 7 | 2.9 | 53.9 | 9.9 |
| Example 4 | 21.1 | 7.6 | 3.6 | 2.8 | 35.1 | 6.4 |
| Comparative Example 1 | 28.3 | 7.7 | 3.7 | 2 | 41.7 | 5.7 |

TABLE 3-continued

| | C—C | C—O | C═O | O—C═O | C | C═O + O—C═O |
|---|---|---|---|---|---|---|
| Comparative Example 2 | 45.4 | 9.3 | 3.1 | 2.1 | 59.9 | 5.2 |
| Comparative Example 3 | 19.3 | 8 | 3.3 | 1.5 | 32.1 | 4.8 |
| Comparative Example 4 | 17.6 | 12.7 | 2.5 | 2.4 | 38.2 | 4.9 |
| Comparative Example 5 | 32 | 14.9 | 4.2 | 1.3 | 52.4 | 5.5 |

The unit of the numbers described in Table 3 above is atomic % (at %).

In Table 2 and Table 3 above, the C represents the content of the total carbon present on the surface of the polymer according to XPS analysis, and the C—C, C═O, C═O, and O—C═O respectively represent the content of carbon included in the C—C, C═O, C═O, and O—C═O bond structures present on the surface of the polymer according to the XPS analysis. The C═O+O—C═O represents the sum of the content of carbon included in the C═O bond structure present on the surface of the polymer according to the XPS analysis and the content carbon included in the O—C═O bond structure present on the surface of the polymer according to the XPS analysis.

<Experimental Examples 2 and 3>Free swelling capacity ($FSC_{110}$) and absorbency ($WFA_{110}$) in water having electrical conductivity value of 110 μS/cm For the super absorbent polymer of Example 1, a free swelling capacity ($FSC_{110}$) and a water absorbency ($WFA_{110}$) in water having an electrical conductivity value of 110 μS/cm at 24° C. were measured by the following methods. Detailed measurement processes were as follows.

① Tea bags for broth in a size of 18 cm×28 cm were respectively placed in a total of eight 2 L beakers.

② 1 L of water having an electrical conductivity value of 110 μS/cm at 24° C. was introduced into each of the beakers, and then the tea bag was left to stand in a submerged state in each of the beakers for (10 seconds/20 seconds/30 seconds/60 seconds/120 seconds/300 seconds/600 seconds/1800 seconds).

③ The tea bag for broth was taken out of each beaker after (10 seconds/20 seconds/30 seconds/60 seconds/120 seconds/300 seconds/600 seconds/1800 seconds), and then a weight $W_a$ of the tea bag for broth was recorded when water stopped dripping from the tea bag for broth. Among the above, a weight of the tea bag for broth taken out after 60 seconds (1 minute), the weight measured when water stopped from dripping from the tea bag, was defined as $W_1$, (a blank value).

④ Tea bags for broth in a size of 18 cm×28 cm were respectively placed in another total of eight 2 L beakers.

⑤ 1 g of the super absorbent polymer (SAP) of Example 1 was accurately weighed and evenly sprinkled at a lower end of each of the tea bags for broth.

⑥ 1 L of water having an electrical conductivity value of 110 μS/cm at 24° C. was introduced into each of the beakers, and then the tea bag was respectively left to stand in a submerged state in each of the beakers for (10 seconds/20 seconds/30 seconds/60 seconds/120 seconds/300 seconds/600 seconds/1800 seconds).

⑦ The tea bag for broth sprinkled with the super absorbent polymer was taken out of each beaker after (10 seconds/

20 seconds/30 seconds/60 seconds/120 seconds/300 seconds/600 seconds/1800 seconds), a weight $W_s$ of the tea bag for broth sprinkled with the super absorbent polymer was recorded when water having an electrical conductivity value of 110 μS/cm stopped dripping from the tea bag for broth. Among the above, a weight of the tea bag for broth sprinkled with the super absorbent polymer and taken out after 60 seconds (1 minute), the weight measured when water stopped from dripping from the tea bag, was defined as $W_2$.

⑧ The weight of the tea bag for broth measured in each beaker was applied to Mathematical formula 2 below to calculate a free swelling capacity $FSC_{110}$ in water having an electrical conductivity value of 110 μS/cm at 24° C.

$$FSC_{110}(g/g)=W_a-W_s \quad \text{[Mathematical formula 2]}$$

⑨ A absorbency $WFA_{110}$ in water having an electrical conductivity of 110 μS/cm was calculated by using Mathematical formula 3 below. That is, the absorbency $WFA_{110}$ in water having an electrical conductivity of 110 μS/cm represents the free swelling capacity $FSC_{110}$ in water having an electrical conductivity of 110 μS/cm at 24° C. calculated using the tea bag for broth introduced into the beaker for 1 minute.

$$WFA_{110}(g/g)=W_2-W_1 \quad \text{[Mathematical formula 3]}$$

In addition, the same experiment was additionally conducted on the super absorbent polymers of Examples 2 to 4 and Comparative Example 5 as on the super absorbent polymer of Example 1.

The results are described in Table 4 and Table 5 below.

TABLE 4

| | Free swelling capacity $FSC_{110}$ (g/g) over time in water having electrical conductivity of 110 μS/cm at 24° C. Swelling time, t (s) | | | | | | | |
|---|---|---|---|---|---|---|---|---|
| | 10 | 20 | 30 | 60 | 120 | 300 | 600 | 1800 |
| Example 1 | 54 | 90 | 124 | 211 | 264 | 341 | 364 | 386 |
| Example 2 | 36 | 63 | 106 | 185 | 253 | 303 | 321 | 331 |
| Example 3 | 49 | 77 | 107 | 189 | 301 | 316 | 320 | 386 |
| Example 4 | 35 | 49 | 103 | 161 | 281 | 305 | 316 | 324 |
| Comparative Example 1 | 29 | 48 | 76 | 120 | 204 | 287 | 313 | 309 |
| Comparative Example 2 | 17 | 31 | 47 | 104 | 168 | 282 | 345 | 375 |
| Comparative Example 3 | 35 | 50 | 71 | 111 | 184 | 266 | 311 | 371 |
| Comparative Example 4 | 36 | 55 | 76 | 92 | 186 | 259 | 306 | 336 |
| Comparative Example 5 | 20 | 35 | 64 | 115 | 171 | 270 | 320 | 375 |

TABLE 5

| | C═O + O—C═O (at %) | $WFA_{-110}$ (g) |
|---|---|---|
| Example 1 | 10.2 | 211 |
| Example 2 | 8.6 | 185 |
| Example 3 | 6.2 | 189 |
| Example 4 | 6.4 | 161 |
| Comparative Example 1 | 5.7 | 120 |
| Comparative Example 2 | 5.2 | 104 |
| Comparative Example 3 | 4.8 | 112 |
| Comparative Example 4 | 4.9 | 92 |
| Comparative Example 5 | 5.5 | 115 |

In Table 4 above, the C═O+O—C═O represents the sum of the content of carbon included in the C═O bond structure and the content carbon included in the O—C═O bond structure.

<Experimental Example 4>Centrifuge Retention Capacity (CRC, g/g)

The centrifuge retention capacity of the super absorbent polymers of the examples and comparative examples by the absorption rate under no-load was measured according to the European Disposables and Nonwovens Association (EDANA) standard EDANA WSP 241.3.

Measurements were performed at a temperature of 23±2° C. and a relative humidity of 45±15% as described in EDANA WSP 241.0.

Specifically, $W_0$ (g) (about 0.2 g) of the super absorbent polymer obtained through each of the examples and comparative examples was uniformly placed in a nonwoven bag, sealed, and then immersed in saline (0.9 wt %) at room temperature. After 30 minutes, water was removed from the bag using a centrifuge at 250 G for 3 minutes, and the mass $W_2$ (g) of the bag was measured. In addition, the same operation was performed without using the resin, and the mass $W_1$ (g) at that time was measured.

Using each mass obtained, CRC (g/g) was calculated according to the following Mathematical formula 4.

$$CRC(g/g)=\{[W_2(g)-W_1(g)]/W_0(g)\}-1 \quad \text{[Mathematical formula 4]}$$

The measurement was repeated five times, and the average and standard deviation were calculated.

The results are shown in Table 6 below.

<Experimental Example 5>Absorbency under pressure (AUP, g/g)

The absorbency under pressure of the super absorbent polymers of the examples and comparative examples at 0.3 psi was measured according to the EDANA method WSP 242.3.

Measurements were performed at a temperature of 23±2° C. and a relative humidity of 45±15% as described in EDANA WSP 242.0.

Specifically, a 400 mesh stainless steel wire mesh was installed on the bottom of a plastic cylinder with an inner diameter of 25 mm. Under the conditions of room temperature and 50% humidity, $W_0$ (g) (0.9 g) of the super absorbent polymer was uniformly sprayed on the wire mesh, and a piston capable of uniformly applying a load of 0.3 psi thereon was formed with an outer diameter slightly smaller than 25 mm, and there were no gap with the inner wall of the cylinder and no obstructed up-and-down movement. At this time, the weight $W_3$ (g) of the device was measured.

A glass filter with a diameter of 90 mm and a thickness of 5 mm was placed on the inside of a petroleum dish with a diameter of 150 mm, and saline composed of 0.9 wt % sodium chloride was placed so that it was at the same level as the upper surface of the glass filter. A sheet of filter paper with a diameter of 90 mm was placed thereon. The measuring device was placed on a filter paper and the liquid was absorbed under a load for 1 hour. After 1 hour, the measuring device was lifted and its weight $W_4$ (g) was measured.

Using each mass obtained, the absorbency under pressure (g/g) was calculated according to the following Mathematical formula 5.

$$AUP(g/g)=[W_4(g)-W_3(g)]/W_0(g) \quad \text{[Mathematical formula 5]}$$

The measurement was repeated five times, and the average and standard deviation were calculated.

The results are shown in Table 6 below.

Experimental Example 6>Effective Absorption Capacity (EFFC)

The measured retention capacity and absorbency under pressure were applied to Mathematical formula 6 below to calculate the effective absorption capacity (EFFC).

$$EFFC=(CRC+AUP)/2 \quad \text{[Mathematical formula 6]}$$

in Mathematical formula 6,

CRC represents a centrifuge retention capacity (units: g/g) as measured according to the EDANA method WSP 241.3, and AUP represents an absorbency under pressure (units: g/g) as measured under 0.3 psi according to EDANA method WSP 242.3.

The results are shown in Table 6 below.

<Experimental Example 7>Absorption rate (Vortex time)

The absorption rate (vortex time) of the super absorbent polymer of the examples and comparative examples was measured by the following method.

① First, 50 mL of 0.9% brine was input to a 100 ml beaker with a flat bottom using a 100 mL mass cylinder.

② Next, the beaker was placed in the center of the magnetic stirrer, and a circular magnetic bar (diameter 30 mm) was placed inside the beaker.

③ Thereafter, the stirrer was operated so that the magnetic bar stirred at 600 rpm, and the lowest part of the vortex created by the stirring was made to touch the top of the magnetic bar.

④ After confirming that the temperature of the brine in the beaker was 24.0° C., 2±0.01 g of the super absorbent polymer sample was input while simultaneously operating a stopwatch, and the time until the vortex disappeared and the liquid surface became completely horizontal was measured in seconds, which was taken as the absorption rate.

The results are described in Table 6 below.

TABLE 6

| | CRC (g/g) | 0.3AUP (g/g) | EFFC (g/g) | Vortex time (sec) |
|---|---|---|---|---|
| Example 1 | 38.8 | 32.0 | 35.4 | 18 |
| Example 2 | 37.8 | 30.2 | 34.0 | 31 |
| Example 3 | 36.1 | 32.1 | 34.1 | 29 |
| Example 4 | 36.7 | 29.0 | 32.9 | 27 |
| Comparative Example 1 | 35.6 | 30.1 | 32.9 | 38 |
| Comparative Example 2 | 36.3 | 30.7 | 33.5 | 42 |
| Comparative Example 3 | 35.1 | 29.3 | 32.2 | 37 |
| Comparative Example 4 | 31.3 | 30.3 | 30.8 | 42 |
| Comparative Example 5 | 35.9 | 27.3 | 31.6 | 38 |

Since there is little difference in absorption capacity according to an electrical conductivity value within a range in which the electrical conductivity value is from 100 μS/cm to 130 μS/cm, it can be fully expected that absorption capacity in water having an electrical conductivity value in the range of 100 μS/cm to 130 μS/cm will be the same as absorption capacity in water having an electrical conductivity value of 110 μS/cm.

As can be confirmed from Tables 4 to 6 above, it has been confirmed that Examples which satisfy the content of carbon included in the C═O and O—C═O bond structures among all elements present on the surface of the super absorbent polymer of the present disclosure is superior to Comparative Examples in absorption rate and absorption amount. That is, it has been confirmed that the super absorbent polymer of the present disclosure has excellent absorption capacity in water having an electrical conductivity value of 110 μS/cm.

A super absorbent polymer of the present disclosure may quickly absorb body fluids when applied to a product and retain a large amount of body fluids without leaking the same to the outside. That is, the super absorbent polymer of the present disclosure is excellent in absorption performance.

What is claimed is:

1. A polyacrylic acid (salt)-based super absorbent polymer, comprising:

carbon, oxygen, and sodium on the surface thereof; and the super absorbent polymer satisfies Equation 1 below:

$$X_{C=O}+X_{O-C=O} \geq 6 \text{(at \%)} \quad \text{[Equation 1]}$$

wherein, $X_{C=O}$ represents a content (at %) of carbon included in a C═O bond structure among all elements present on the surface of the super absorbent polymer according to XPS analysis, and $X_{O-C=O}$ represents a content (at %) of carbon included in a O—C═O bond structure among all elements present on the surface of the super absorbent polymer according to XPS analysis, wherein the super absorbent polymer satisfies Equation 2 below:

$$X_{C=O}+X_{O-C=O} \leq 15 \text{(at \%)} \quad \text{[Equation 2]}$$

2. The super absorbent polymer of claim 1, wherein the super absorbent polymer satisfies Equation 3 below:

$$X_{C=O} \geq X_{O-C=O} \quad \text{[Equation 3].}$$

3. The super absorbent polymer of claim 1, wherein the $X_{O-C=O}$ is 2.5 at % or greater.

4. The super absorbent polymer of claim 1, wherein the $X_{C=O}$ is 3.5 at % or greater.

5. The super absorbent polymer of claim 1, wherein the super absorbent polymer satisfies Equation 4 below:

$$(X_{O-C=O}/X_C) \times 100(\%) \leq 10(\%) \quad \text{[Equation 4]}$$

wherein, $X_C$ represents a total content (at %) of carbon among all elements present on the surface of the super absorbent polymer according to XPS analysis.

6. The super absorbent polymer of claim 1, wherein a content ($X_o$) of an oxygen element with respect to all elements present on the surface of the super absorbent polymer according to XPS analysis is 50 at % or less.

7. The super absorbent polymer of claim 1, wherein a content ($X_{Na}$) of a sodium element with respect to all elements present on the surface of the super absorbent polymer according to XPS analysis is 6 at % or less.

8. The super absorbent polymer of claim 1, wherein a content ($X_{Si}$) of a silicon element with respect to all elements present on the surface of the super absorbent polymer according to XPS analysis is 15 at % or less.

9. The super absorbent polymer of claim 1, wherein the super absorbent polymer satisfies Equation 6 below:

$$X_{C=O}+X_{O-C=O}>X_{Na} \quad \text{[Equation 6]}$$

wherein, $X_{Na}$ represents a content (at %) of sodium among all elements present on the surface of the super absorbent polymer according to XPS analysis.

10. The super absorbent polymer of claim 1, wherein the super absorbent polymer comprises one or more elements selected from the group consisting of silicon, nitrogen, aluminum, and sulfur on the surface of the super absorbent polymer.

11. The super absorbent polymer of claim 1, wherein when the super absorbent polymer is swollen for 1 minute with water having an electrical conductivity value of 100 µS/cm to 130 µS/cm, a free swell capacity of water containable by the super absorbent polymer is 130 g/g or greater.

12. A polyacrylic acid (salt)-based super absorbent polymer, comprising:

carbon, oxygen, and sodium on the surface thereof; and the super absorbent polymer satisfies Equation 1 below:

$$X_{C=O}+X_{O-C=O}\geq 6(\text{at }\%) \quad \text{[Equation 1]}$$

wherein, $X_{C=O}$ represents a content (at %) of carbon included in a C═O bond structure among all elements present on the surface of the super absorbent polymer according to XPS analysis, and $X_{O-C=O}$ represents a content (at %) of carbon included in a O—C═O bond structure among all elements present on the surface of the super absorbent polymer according to XPS analysis, wherein the super absorbent polymer satisfies Equation 4 below:

$$(X_{O-C=O}/X_C)\times 100(\%)\leq 10(\%) \quad \text{[Equation 4]}$$

wherein, $X_C$ represents a total content (at %) of carbon among all elements present on the surface of the super absorbent polymer according to XPS analysis.

* * * * *